(12) United States Patent
Blasius, Jr. et al.

(10) Patent No.: US 6,984,694 B2
(45) Date of Patent: Jan. 10, 2006

(54) OLIGOMERIC CHAIN EXTENDERS FOR PROCESSING, POST-PROCESSING AND RECYCLING OF CONDENSATION POLYMERS, SYNTHESIS, COMPOSITIONS AND APPLICATIONS

(75) Inventors: William George Blasius, Jr., Charlton, MA (US); Gary A. Deeter, Racine, WI (US); Marco A. Villalobos, Racine, WI (US)

(73) Assignee: Johnson Polymer, LLC, Sturtevant, WI (US)

( * ) Notice: Subject to any disclaimer, the term of this patent is extended or adjusted under 35 U.S.C. 154(b) by 277 days.

(21) Appl. No.: 10/342,502

(22) Filed: Jan. 15, 2003

(65) Prior Publication Data
US 2004/0138381 A1     Jul. 15, 2004

Related U.S. Application Data

(60) Provisional application No. 60/353,142, filed on Feb. 1, 2002.

(51) Int. Cl.
C08F 24/00  (2006.01)

(52) U.S. Cl. .................. 525/148; 525/123; 525/131; 525/132; 525/153; 525/154; 525/163; 525/165; 525/178; 526/273; 526/317.1; 526/319; 526/328; 526/328.5; 526/329.7; 526/346

(58) Field of Classification Search .............. 525/123, 525/131, 132, 148, 153, 154, 163, 165, 178; 526/273, 317.1, 319, 328, 328.5, 329.7, 346
See application file for complete search history.

(56) References Cited

U.S. PATENT DOCUMENTS

| | | | |
|---|---|---|---|
| 3,714,120 A * | 1/1973 | Labana et al. ............. | 525/113 |
| 4,312,726 A | 1/1982 | Vrancken et al. ........ | 204/159.23 |
| 4,399,241 A | 8/1983 | Ting et al. ................ | 523/400 |
| 4,485,199 A | 11/1984 | Kordomenos et al. ..... | 523/400 |
| 5,073,595 A | 12/1991 | Almer et al. .............. | 525/65 |
| 5,264,487 A | 11/1993 | Scobbo, Jr. et al. ........ | 525/68 |
| 5,268,438 A | 12/1993 | Carson et al. ............. | 526/273 |
| 5,310,799 A | 5/1994 | Carson et al. ............. | 525/176 |
| 5,354,802 A | 10/1994 | Shiwaku et al. ........... | 524/494 |
| 5,475,058 A | 12/1995 | Horiuchi et al. ........... | 525/166 |
| 5,523,135 A | 6/1996 | Shiwaku et al. ........... | 428/35.7 |
| 5,565,525 A * | 10/1996 | Morimoto et al. ......... | 525/259 |
| 5,693,681 A | 12/1997 | Pfaendner et al. ......... | 521/48 |
| 5,739,230 A * | 4/1998 | Yuasa et al. .............. | 526/217 |
| 5,744,554 A | 4/1998 | Pfaendner et al. ......... | 525/439 |
| 5,747,606 A | 5/1998 | Pfaendner et al. ......... | 525/438 |
| 5,807,932 A | 9/1998 | Pfaendner et al. ......... | 525/423 |
| 5,859,073 A | 1/1999 | Pfaendner et al. ......... | 521/48 |
| 6,028,129 A | 2/2000 | Pfaendner et al. ......... | 524/99 |
| 6,037,423 A | 3/2000 | Nagano et al. ............ | 525/438 |
| 6,228,980 B1 | 5/2001 | Loontjens et al. ......... | 528/480 |
| 6,265,533 B1 | 7/2001 | Regel et al. .............. | 528/487 |
| 6,350,822 B1 | 2/2002 | Van Diepen et al. ....... | 525/444 |
| 6,353,082 B1 | 3/2002 | Wang ....................... | 528/272 |
| 6,437,056 B1 * | 8/2002 | Dahm et al. .............. | 525/438 |
| 6,515,044 B1 | 2/2003 | Idel et al. ................. | 523/351 |
| 6,552,144 B1 * | 4/2003 | Campbell et al. .......... | 526/273 |
| 6,605,681 B1 * | 8/2003 | Villalobos et al. ......... | 526/319 |
| 2002/0156188 A1 | 10/2002 | Anderson et al. .......... | 525/107 |

FOREIGN PATENT DOCUMENTS

| | | |
|---|---|---|
| AU | WO 01/21373 | 3/2001 |
| CH | 686 082 A5 | 12/1995 |
| DE | 39 24237 | 1/1990 |
| EP | 0 531 008 | 8/1992 |
| EP | 0 984 027 | 4/1998 |
| EP | 1 000 963 | 11/1998 |
| EP | 1 293 527 A1 | 3/2003 |
| IT | WO 99/28367 | 6/1999 |
| NL | WO 01/66633 | 9/2001 |

OTHER PUBLICATIONS

Xanthos, M., et al; *Comparison of Pet Chemical Modifiers for Extrusion Foaming*. Polymer Processing Institute 1876; ANTEC Annual Technical Conference (p 1876-1880) (2002.

Dhavalikar, R., et al.;*PET/Epoxide Reactive Extrusion Process Requirements from Batch Kinetic Data*. Polymer Processing Institute; ANTEC Annual Technical Conference) (p 1776-1780) (2002.

Dhavalikar, R., et al.; *Parameters Affecting the Chain Extension and Branching f PET in the Melt State by Polyepoxides*. Journal of Applied Polymer Science, vol. 87, 643-652 (2003).

Bikiaris, D., et al; *Chain Extension of Polyesters PET and PBT with Two New Diimidodiepoxides, II*. Journal of Polymer Science: Part A: Polymer Chemistry, vol. 34, 1337-1342 (1996).

Dhavalikar, R., et al; *Molecular and Structural Analysis of a Triepoxide-Modified Poly(ethylene Terephathalate) from Rheological Data*. Journal of Polymer Science; Part A: Polymer Chemistry, vol. 41, 958-969 (2003).

Jacques, B., et al.; *Reactions Induced by Triphenyl Phosphite Addition During Melt Mixing of Poly(ethylene terephathalate)/ Blends; Influence of Phosphite Structure and Polyester Chain-end Concentration*. Elsevier Science Ltd. Polymer, vol. 37 No. 18, pp. 4085-4097 (1996).

* cited by examiner

Primary Examiner—Jeffrey B. Robertson
(74) Attorney, Agent, or Firm—Renee J. Rymarz; James J. Sales; Neil E. Hamilton

(57) ABSTRACT

The invention provides chain extenders made from epoxy-functional (meth)acrylic monomers and styrenic and/or (meth)acrylic monomers. The invention further provides polymeric compositions made from the chain extenders and plastic articles made from the compositions. Finally, the invention provides methods of using the chain extenders to improve the properties of virgin, recycled, and reprocessed condensation polymers.

38 Claims, 2 Drawing Sheets

US 6,984,694 B2

OLIGOMERIC CHAIN EXTENDERS FOR PROCESSING, POST-PROCESSING AND RECYCLING OF CONDENSATION POLYMERS, SYNTHESIS, COMPOSITIONS AND APPLICATIONS

CROSS-REFERENCES TO RELATED APPLICATIONS

Priority is based on Provisional Application 60/353,142 filed Feb. 1, 2002.

FIELD OF THE INVENTION

The invention is directed to chain extenders made from epoxy-functional monomers, polymeric compositions and articles made therefrom.

BACKGROUND OF THE INVENTION

Many condensation or step-growth polymers, including polyesters, polyamides, polycarbonates, and polyurethanes are widely used to make plastic products such as films, bottles, and other molded products. The mechanical and physical properties of these polymers are highly dependent on their molecular weights.

In a life cycle, these materials may experience a synthesis process, followed by an extrusion step, and a final processing step which may be another compounding/extrusion operation followed by profile or sheet forming, thermoforming, blow molding, or fiber spinning, or they can be injection or otherwise molded in the molten state. Typically, all of these steps occur under high temperature conditions. In addition, in recent years, increased attention has been focused on improved methods of reclaiming and recycling the plastics made from these polymers, with an eye toward resource conservation and environmental protection. The processing steps involved in recycling these polymers also involve high temperatures.

In each one of these high temperature steps, particularly during the compounding/processing and reclaiming/recycling processes, some degree of polymer molecular weight degradation occurs. This molecular weight degradation may occur via high temperature hydrolysis, alcoholysis or other depolymerization mechanisms well know for these polycondensates. It is known that molecular weight degradation negatively affects the mechanical, thermal, and rheological properties of materials, thus preventing them from being used in demanding applications or from being recycled in large proportions for their original applications. Today, recycled or reprocessed polycondensates with deteriorated molecular weights can only be used in very low proportions in demanding applications or in larger proportions in less demanding applications. For instance, due to molecular weight degradation, recycled bottle grade polyethylene terephthalate (PET) is mostly employed exclusively in fiber and other low end applications. Similarly, recycled polycarbonate from compact disk (CD) scrap, mostly goes to low end applications. For these reasons, the current recycling technologies are limited to a narrow range of applications.

Today, there exist a considerable number of processes in the art employed to minimize loss in molecular weight and to maintain or even increase the molecular weight of the polycondensates for processing or recycling. Most of these routes employ as main processing equipment either an extruder, a solid state polycondensation reactor, or both in sequence, or similar equipment designed for melt or high viscosity material processing. As an instrumental part of any of these processes, chemical reactants known in the art as "chain extenders" are employed. Chain extenders are, for the most part, multi-functional molecules that are included as additives in the reactor or extruder during any or all of the described processing steps with the purpose of "re-coupling" polycondensate chains that have depolymerized to some degree. Normally the chain extender has two or more chemical groups that are reactive with the chemical groups formed during the molecular weight degradation process. By reacting the chain extender molecule with two or more polycondensate fragments it is possible to re-couple them (by bridging them), thus decreasing or even reverting the molecular weight degradation process. In the art there are numerous chain extender types and compositions, polycondensate formulations, and processing conditions described to this end.

Di- or poly-functional epoxides, epoxy resins or other chemicals having two or more epoxy radicals, are an example of chain extending modifiers that have been used to increase the molecular weight of recycled polymers. These di- or poly-functional epoxides are generally made using conventional methods by reacting a epichlorohydrin with a molecule having two or more terminal active hydrogen groups. Examples of such chain extenders include bisphenol type epoxy compounds prepared by the reaction of bisphenol A with epichlorohydrin, novolak type epoxy compounds prepared by reacting novolak resins with epichlorohydrin, polyglycidyl esters formed by reacting carboxylic acids with epichlorohydrin, and glycidyl ethers prepared from aliphatic alcohols and epichlorohydrin. Additionally, various acrylic copolymers have been used as polymer additives to improve the melt strength and melt viscosity of polyesters and polycarbonates. These additives generally include copolymers derived from various epoxy containing compounds and olefins, such as ethylene. However, these chain extenders have met with limited success in solving the problem of molecular weight degradation in reprocessed polymers. The shortcomings of these copolymer chain extenders can be attributed, at least in part, to the fact that they are produced by conventional polymerization techniques which produce copolymers of very high molecular weight, which when coupled with a polycondensate can dramatically increase the molecular weight leading to localized gelation and other defects with physical characteristics which limit their capacity to act as chain extenders.

Two main problems persist today in the art. First, in order to have efficient chain extension at reasonable residence times (i.e., good productivity in a given size equipment) either in the extrusion or solid state reactor systems, most of the known chain extenders require the use of pre-dried polycondensate material, operation at high vacuum, and varying amounts of catalyst and stabilizers, to be employed during processing. Without these features the extent of molecular weight increase is limited and the resulting product shows lower molecular weight and less than desired properties.

Second, as the functionality of the chain extender increases, so does the number of polycondensate chains that can be coupled onto each chain extender molecule, and thus its effectiveness in re-building molecular weight. However, it is easy to see that as the functionality of these chain extenders increase so does the potential for onset of gelation. People skilled in the art are familiar with the strong negative effects associated with extensive crosslinking on the degree of crystallinity and thus on the mechanical properties of a semi-crystalline polycondensate, as well as the negative implications of the presence of varying amounts of gel in any product. As a result of these negative effects there is a limit for the maximum functionality that can be employed with these chain extenders. Given, then, that the maximum functionality is limited, effective chain extension currently requires relatively large concentrations of lower functionality ($\leq 4$ functional groups/chain) chain extenders.

The relatively high costs associated with these two limitations of the current art render the re-processing or recycling of these polycondensates uneconomical.

Still other disadvantages are associated with the presently available chain extenders. For example, phosphite-based chain extenders suffer from the disadvantage of being highly volatile, high viscosity liquids which are cumbersome to handle, susceptible to hydrolysis and suspected endocrine disrupters. Some ethylene based epoxy-functional chain extenders have the disadvantage of having high molecular weights compared to polycondensates, which alters the nature of resulting chain extended polymer, minimizing motility, increasing the chance for gel formation, and altering chemical resistance and clarity. Titanate- and zirconate-based chain extenders have the disadvantages of high cost, induced color in the product, difficult handling due to solvent dilutes, and viscosity reduction. Finally, isocyanate-based chain extenders suffer from toxicity concerns, reactivity to moisture and general handling problems.

Thus a need exists for chain extenders that may be used in any suitable process while avoiding the processing limitations described above. Such chain extenders would provide substantial economic advantage in processing, reprocessing and recycling of polycondensates over existing chain extenders and the methods for their use.

SUMMARY OF THE INVENTION

This invention relates to novel oligomeric and low molecular weight polymeric chain extenders, to methods for making the chain extenders, to methods for using the chain extenders to improve the physical characteristics of polycondensates and blends of polycondensates and to products made from the improved polycondensates and polycondensate blends. As used, herein, the terms "polycondensates" and the term "condensation polymers" are used broadly and synonymously to mean step-growth polymers. Thus, for the purposes of this specification, the two terms may be used interchangeably. The chain extenders of this invention are particularly well suited for use with reprocessed or recycled plastics.

The chain extenders of this invention, which are made from epoxy-functional (meth)acrylic monomers and non-functional (meth)acrylic and/or styrenic monomers, are characterized by certain physical and chemical properties that make them particularly suited as chain extenders. These properties can be tailored through the specific composition of the chain extenders and they include molecular weight, epoxy equivalent weight (EEW), number average epoxy functionality (Efn), and weight average epoxy functionality (Efw).

One aspect of the invention provides chain extenders made from the polymerization of at least one epoxy-functional (meth)acrylic monomer and at least one non-functional styrenic and/or (meth)acrylic monomer. The chain extenders are characterized by having a broad range of EEW values from moderately low to very high. In certain embodiments the chain extenders are characterized by EEW values of from about 180 to about 2800, number average molecular weights ($M_n$) of less than about 6000, Efn values of less than about 30 and Efw values of up to about 140.

Another aspect of the invention provides chain-extended polymeric compositions made from a condensation polymer that has been chain extended with the chain extenders of the present invention. The invention also provides plastic articles made from the chain-extended polymeric compositions.

Yet another aspect of the invention provides a method for increasing the molecular weight of a condensation polymer by reacting the condensation polymer with the chain extenders of the present invention.

The chain extenders of the present invention provide several advantages over other presently available chain extenders. For example, by combining low molecular weights with low EEW values, the chain extenders are able to achieve a high degree of chain binding without inducing gelation using only small quantities. In addition, the chain extenders provide numerous processing advantages over other known chain extenders. These advantages include, the minimization or even elimination of the need to pre-dry the condensation polymer and the elimination of the need for a catalyst or high vacuum processing conditions to achieve effective chain extension. In addition, because the chain extenders of the invention are resistant to gelation, the chain extension may take place over much shorter residence times and under higher processing conditions than other chain extenders, making the processing more time and cost efficient. Finally, unlike many conventional chain extenders, the chain extenders provided herein do not require solid state polymerization steps to increase the molecular weight of the polycondensates to desired levels.

DETAILED DESCRIPTION OF THE INVENTION

Figure 1:
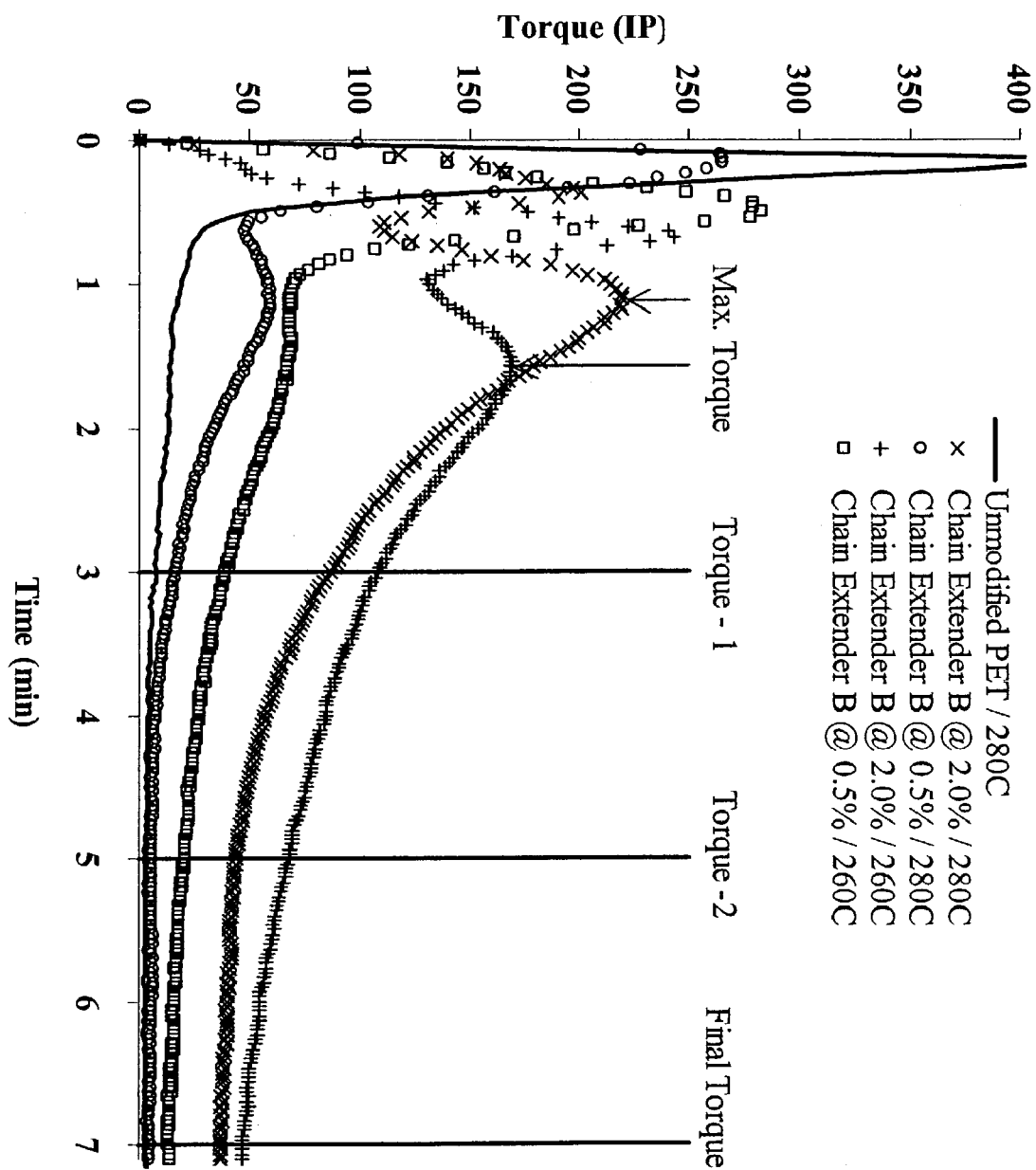
FIG. 1. Examples of torque vs. time traces for virgin PET and PET modified with chain extender B at different loads and temperatures. Values of interest are maximum torque following melting (Max. Torque, Inch Pounds—IP), time to maximum torque, and torque at three (Torque-1), five (Torque-2), and seven minutes (Final Torque). Torque is directly related to melt viscosity which in turn is directly related to molecular weight.

One aspect of this invention provides epoxy-functional oligomeric and low molecular weight chain extenders for use with plastics, including reprocessed or recycled plastics. The chain extenders are capable of reverting the post-processing molecular weight decrease in different polycondensates from the minimum value reached without chain extension, back to the initial molecular weight values or even larger than the original molecular weight values, without the incidence of gel and without adverse effects on mechanical, thermal, or rheological properties at a target polycondensate molecular weight. This is accomplished through the proper design of the chain extenders which make it possible to increase the molecular weight of polycondensates such as polyesters, polyamides, polycarbonates and others, in a controlled manner. In particular, this aspect of the invention provides chain extenders made from the polymerization of at least one epoxy-functional (meth) acrylic monomer and at least one non-functional styrenic and/or (meth)acrylic monomer. The chain extenders are characterized by relatively low EEW values and relatively low molecular weights.

The chain extenders of the present invention are epoxy-functional styrene (meth)acrylic copolymers produced from monomers of at least one epoxy-functional (meth)acrylic monomer and at least one non-functional styrenic and/or (meth)acrylic monomer. As used herein, the term (meth) acrylic includes both acrylic and methacrylic monomers. Examples of epoxy-functional (meth)acrylic monomers for use in the present invention include both acrylates and methacrylates. Examples of these monomers include, but are not limited to, those containing 1,2-epoxy groups such as glycidyl acrylate and glycidyl methacrylate. Other suitable epoxy-functional monomers include allyl glycidyl ether, glycidyl ethacrylate, and glycidyl itoconate.

Suitable acrylate and methacrylate monomers for use in the chain extenders include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Non-functional acrylate and non-functional methacrylate monomers include butyl acrylate, butyl methacrylate, methyl methacrylate, iso-butyl methacrylate, cyclohexyl acrylate, cyclohexyl methacrylate, isobornyl acrylate and isobornyl methacrylate and combinations thereof are particularly suitable. Styrenic monomers for use in the present invention include, but are not limited to, styrene, alpha-methyl styrene, vinyl toluene, p-methyl styrene, t-butyl styrene, o-chlorostyrene, vinyl pyridine, and mixtures of these species. In certain embodiments the styrenic monomers for use in the present invention are styrene and alpha-methyl styrene.

In one embodiment of the invention, the chain extenders contain about 50% to about 80% by weight, based on the total weight of the monomers, of at least one epoxy-functional (meth)acrylic monomer and between about 20% and about 50% by weight of at least one styrenic monomer. In other embodiments, the chain extenders contain between about 25% and about 50% by weight of at least one epoxy-functional (meth)acrylic monomer, between about 15% to about 30% by weight of at least one styrenic monomer, and between about 20% and about 60% by weight of at least one non-functional acrylate and/or methacrylate monomer. In yet another embodiment of the invention, the chain extenders contain about 50% to about 80% by weight, based on the total weight of the monomers, of at least one epoxy-functional (meth)acrylic monomer and between about 15% and about 45% by weight of at least one styrenic monomer and between about 0% to about 5% by weight of at least one non-functional acrylate and/or methacrylate monomer. In still another embodiment, the chain extenders contain between about 5% and about 25% by weight of at least one epoxy-functional (meth)acrylic monomer, between about 50% to about 95% by weight of at least one styrenic monomer, and between about 0% and about 25% by weight of at least one non-functional acrylate and/or methacrylate monomer.

The present invention is based, at least in part, on the inventors' surprising discovery that styrene (meth)acrylic chain extenders having certain physical properties produce superior results at lower loadings than conventional chain extenders. Specifically, the inventors' have found that by combining low molecular weights with low EEW values, the chain extenders are able to achieve a high degree of chain binding without inducing gelation. This allows the present chain extenders to be more effective at lower loadings than other chain extenders and produce chain extended condensation polymers that are substantially free from gel particles. In addition, these properties lead to a variety of processing advantages which will be discussed in more detail below. As used herein, the phrase "substantially free from gel particles" means the chain extension reaction takes place in such a manner that gel particle formation is avoided to any extent.

Without wishing or intending to be bound to any particular theory of the invention, the inventors believe the surprising advantages of the epoxy-functional chain extenders of this invention result from favorable combinations of certain Efn, PDI, and EEW values possessed by these oligomers and low molecular weight polymers. These characteristics are believed to allow for the maximization of polycondensate molecular weight increase at a given chain extender load, without the incidence of gel and without adverse effects on the mechanical, thermal, or rheological properties at a target polycondensate molecular weight. Specifically, the present invention provides novel chain extenders having the following characteristics: 1) very high number average epoxy functionality(Efn): Efn values of up to about 30, and, in some cases, even higher than 30, including Efn values ranging from 2 to 20, and further including Efn values ranging from 3 to 10; 2) controlled PDI values ranging from about 1.5 to about 5, including ranges from about 1.75 to about 4, and further including ranges from about 2 to about 3.5; 3) low epoxy equivalent weight (EEW): from about 2800 to about 180, including from about 1,400 to about 190, and further including from about 700 to about 200; 4) very low molecular weights (number average molecular weight ($M_n$)<6,000, weight average molecular weight ($M_w$)<25,000) allowing for high molecular mobility and fast incorporation of the chain extender into the polycondensate melt. The molecular weight ranges above include various embodiments wherein $M_n$ ranges from 1000 to about 5000, including from 1500 to 4000, and further including from 2000 to 3000. The molecular weight ranges above also include various embodiments wherein $M_w$ ranges from 1500 to about 18000, including from 3000 to 13000, and further including from 4000 to 8500. In addition, the chain extenders possess a wide range of solubility parameters tailored for high solubility in polycondensates. In various exemplary embodiments, the chain extenders have an EEW of from about 180 to about 300, an Efn value from about 4 to about 12 and a PDI of from about 1.5 to about 2.8. In other exemplary embodiments, the chain extenders have an EEW of from about 300 to about 500, an Efn value of from about 4 to about 12 and a PDI of from about 2.8 to about 3.2. In still other exemplary embodiments, the chain extenders have an EEW of from about 500 to about 700, an Efn value of from about 4 to about 12 and a PDI of from about 3.2 to about 4.5.

The desired epoxy equivalent weight (EEW) is fixed by the desired content of the epoxy-functional monomer employed (GMA or other). Additionally, at a given EEW, the Efn per chain can be tailored from very low to very high (e.g. >30) by controlling the $M_n$ of the oligomer. Moreover, for a given EEW the Efw can be designed by altering the polydispersity index of the oligomer (PDI=Mw/Mn= Efw/Efn) through changes in composition, processing conditions, and molecular weight. Suitable values of Efw include values of up to about 140, or even higher than 140, including Efw values ranging from 3 to 65, and further including values ranging from 6 to 45.

The chain extenders may by produced according to standard techniques well known in the art. Such techniques include, but are not limited to, continuous bulk polymerization processes, batch, and semi-batch polymerization processes. Production techniques that are well suited for the chain extenders are described in U.S. patent application Ser. No. 09/354,350 and U.S. patent application Ser. No. 09/614,402, the entire disclosures of which are incorporated herein by reference. Briefly, these processes involve continuously charging into a reactor at least one epoxy-functional (meth) acrylic monomer, at least one styrenic and/or (meth)acrylic monomer, and optionally one or more other monomers that are polymerizable with the epoxy-functional monomer, the styrenic monomer, and/or the (meth)acrylic monomer. This process surprisingly produces oligomeric or low molecular weight copolymer compositions having epoxy equivalent weights, number average epoxy functionalities (Efn), weight average epoxy functionalities (Efw), and polydispersity indexes (PDI) (PDI=Efw÷Efn) which dramatically increase the molecular weight of reprocessed plastics without gelation when used in small quantities in the absence of any pretreatment or additional catalysts.

The proportion of monomers charged into the reactor may be the same as those proportions that go into the chain extenders discussed above. Thus, in some embodiments, the reactor may be charged with about 50% to about 80%, by weight, of at least one epoxy-functional (meth)acrylic monomer and with about 20% to about 50%, by weight, of at least one styrenic and/or (meth)acrylic monomer. Alternatively, the reactor may be charged with from about 25% to about 50%, by weight, of at least one epoxy-functional (meth)acrylic monomer and with about 50% to about 75%, by weight, of at least one styrenic and/or (meth)acrylic monomer. In other embodiments the reactor may be charged with from about 5% to about 25%, be weight, of at least one epoxy-functional (meth)acrylic monomer and with about 75% to about 95%, by weight, of at least one styrenic and/or (meth)acrylic monomer.

The reactor may also optionally be charged with at least one free radical polymerization initiator and/or one or more solvents. Examples of suitable initiators and solvents are provided in U.S. patent application Ser. No. 09/354,350. Briefly, the initiators suitable for carrying out the process according to the present invention are compounds which decompose thermally into radicals in a first order reaction, although this is not a critical factor. Suitable initiators include those with half-life periods in the radical decomposition process of about 1 hour at temperatures greater or equal to 90° C. and further include those with half-life periods in the radical decomposition process of about 10 hours at temperatures greater or equal to 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane, 2,2'-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)hexyne-3, and other similar initiators well known in the art. The initiators di-t-butyl peroxide and di-t-amyl peroxide are particularly suited for use in the invention.

The initiator may be added with the monomers. The initiators may be added in any appropriate amount, but preferably the total initiators are added in an amount of about 0.0005 to about 0.06 moles initiator(s) per mole of monomers in the feed. For this purpose initiator is either admixed with the monomer feed or added to the process as a separate feed.

The solvent may be fed into the reactor together with the monomers, or in a separate feed. The solvent may be any solvent well known in the art, including those that do not react with the epoxy functionality on the epoxy-functional (meth)acrylic monomer(s) at the high temperatures of the continuous process described herein. The proper selection of solvent may help decrease or eliminate the gel particle formation during the continuous, high temperature reaction of the present invention. Such solvents include, but are not limited to, xylene, toluene, ethyl-benzene, Aromatic-100®, Aromatic 150®, Aromatic 200® (all Aromatics available from Exxon), acetone, methylethyl ketone, methyl amyl ketone, methyl-isobutyl ketone, n-methyl pyrrolidinone, and combinations thereof. When used, the solvents are present in any amount desired, taking into account reactor conditions and monomer feed. In one embodiment, one or more solvents are present in an amount of up to 40% by weight, up to 15% by weight in a certain embodiment, based on the total weight of the monomers.

The reactor is maintained at an effective temperature for an effective period of time to cause polymerization of the monomers to produce a oligomeric or low molecular weight chain extender from the monomers.

A continuous polymerization process allows for a short residence time within the reactor. The residence time is generally less than one hour, and may be less than 15 minutes. In some embodiments, the residence time is generally less than 30 minutes, and may be less than 20 minutes.

The process for producing the chain extenders may be conducted using any type of reactor well-known in the art, and may be set up in a continuous configuration. Such reactors include, but are not limited to, continuous stirred tank reactors ("CSTRs"), tube reactors, loop reactors, extruder reactors, or any reactor suitable for continuous operation.

A form of CSTR which has been found suitable for producing the chain extenders is a tank reactor provided with cooling coils and/or cooling jackets sufficient to remove any heat of polymerization not taken up by raising the temperature of the continuously charged monomer composition so as to maintain a preselected temperature for polymerization therein. Such a CSTR may be provided with at least one, and usually more, agitators to provide a well-mixed reaction zone. Such CSTR may be operated at varying filling levels from 20 to 100% full (liquid full reactor LFR). In one embodiment the reactor is more than 50% full but less than 100% full. In another embodiment the reactor is 100% liquid full.

The continuous polymerization is carried out at high temperatures. In one embodiment, the polymerization temperatures range from about 180° C. to about 350° C., this includes embodiments where the temperatures range from about 190° C. to about 325° C., and more further includes embodiment where the temperatures range from about 200° C. to about 300° C. In another embodiment, the temperature may range from about 200° C. to about 275° C. Due to their high temperature synthesis the chain extenders of this invention show high thermal stability when used later in chain extending applications in condensation polymer compositions processed at similar temperature ranges. In contrast other chain extenders presently available undergo degradation and gas evolution under these conditions.

A second aspect of the invention provides chain extended polymeric compositions made by reacting the chain extenders of the present invention with condensation polymers to form a substantially gel free chain extended condensation polymer composition. Suitable condensation polymers include, but are not limited to, polyesters (PEs), polyamides (PAs), polycarbonates (PCs), polyurethanes (PUs), polyacetals, polysulfones, polyphenylene ethers (PPEs), polyether sulfones, polyimides, polyether imides, polyether ketones, polyether-ether ketones, polyarylether ketones, polyarylates, polyphenylene sulfides and polyalkyls. In one embodiment of the invention the condensation polymer is a polyester selected from the family of polyethylene terephthalates (PETs), polypropylene terephthalates (PPTs), and polybutylene terephthalates (PBTs). In another embodiment the condensation polymer is a reprocessed or recycled condensation polymer. As used herein, the term reprocessed means a polymer reclaimed from a production facility originally scrapped for not meeting quality control or specification targets. Amongst these can be included products out of specification from compounding, extrusion, or molding start-up and shut down production and/or products from general production out of specification or otherwise not meeting product quality specifications. Also included in the definition of reprocessed products are products processed to final use form but not meeting product specifications, such as product out of caliber or dimensions, color, shape, etc., or waste process material such as injection runners, edges, trim and flashes, etc. As used herein the term recycled condensation polymer means a condensation plastic reclaimed a posteriori from its final use from diverse sources, this include but is not limited to scrap from soda bottles, detergent bottles, plastic toys, engine components, assembled plastic components, films, fibers, CDs, DVDs, and the like.

The polyesters may be homo- or copolyesters that are derived from aliphatic, cycloaliphatic or aromatic dicarboxylic acids and diols or hydroxycarboxylic acids. In addition, mixtures of these polyesters or of polyesters with further plastics are also suitable, for example blends of PBT/PC, PBT/acrylonitrile-butadiene-styrene (ABS), PET/PA, and the like. Their composition will depend essentially on the desired properties for a specific end use. Such polyesters are well known in the art. Particularly suitable polyesters are PET, PBT and corresponding copolymers and blends, as exemplified by PBT/PC, PBT/ASA, PBT/ABS, PET/ABS, PET/PC or also PBT/PET/PC, which predominantly contain the indicated polyesters; PET and its copolymers as well as PBT blends being the preferred choice in certain embodiments.

As used herein, the term polyamide includes various well known polyamide resins. These include polyamides produced by polycondensing a dicarboxylic acid with a diamine, polyamides produced by polymerizing a cyclic lactam, and polyamides produced by co-polymerizing a cyclic lactam with a dicarboxylic acid/diamine salt. The polyamides useful for this invention also include polyamide elastomer resins. Polyamide resins that are particularly suitable for use in the present invention include nylon 6, nylon 6-6, nylon 6-10, nylon 11, nylon 12, and co-polymers and blends thereof.

As used herein, the term polycarbonate includes various well known polycarbonate resins. These include aromatic polycarbonates produced by reactions of bisphenols with carbonic acid derivatives such as those made from bisphenol A (2,2-bis(4-hydroxyphenyl)propane) and phosgene or diphenyl carbonate. Various modified polycarbonates and copolycarbonates made from other types of bisphenols such as those where phenolic radicals in the para position are bridged via C, O, S or alkylene are also included. Polyester carbonates made from one or more aromatic dicarboxylic acids or hydroxycarboxylic acids, bisphenols and carbonic acid derivatives are also included. Polycarbonate resins made from bis-phenol A and carbonic acid derivatives are particularly suitable for this invention.

The thermoplastic polyurethanes of the present invention may be made by any conventional process, as known in the art. Typical polyurethanes are made from a polyol intermediate and generally an equivalent amount of a polyisocyanate. The polyol intermediate is generally a liquid polyether polyol or a polyester polyol or combinations thereof.

Polyether polyols that are use to produce the polyurethanes are generally made by reacting an alkylene oxide, such as propylene oxide, with a strong base such as potassium hydroxide, optionally in the presence of water, glycols and the like. Other polyethers which can be utilized include, but are not limited to, those which are produced by polymerization of tetrahydrofuran or epoxides such as epichlorohydrin, ethylene oxide, propylene oxide, butylene oxide, styrene oxide, for example in the presence of Lewis catalysts such as boron trifluoride, or by the addition of epoxides, optionally mixed or in succession, onto starter components with reactive hydrogen atoms such as water, alcohols, ammonia, or amines.

The polyester polyols that may be used to form the thermoplastic polyurethanes may be formed from the condensation of one or more polyhydric alcohols with one or more polycarboxylic acids. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy) propane, 1,4- and 2,3-butylene glycol, neopentyl glycol, 1,4-bis-(hydroxymethyl)cyclohexane, trimethylolethane, together with di-, tri-, tetra-, and higher polyethylene glycols, di- and higher polypropylene glycols, together with di- and higher polybutylene glycols, and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2- dicarboxylic acid; 1,4-cyclohexadiene-1,2-dicarboxylic acid; 3-methyl-3,5-cyclohexadiene-1,2-dicarboxylic acid and the corresponding acid anhydrides such as tetrahydrophthalic anhydride, hexahydrophthalic anhydride, tetrachlorophthalic anhydride, endomethylenetetrahydrophthalic anhydride, acid chlorides and acid esters such as phthalic anhydride, phthaloyl chloride and the dimethyl ester of phthalic acid, dimerized and trimerized unsaturated fatty acids, optionally mixed with monomeric unsaturated fatty acids, terephthalic acid monomethyl ester and terephthalic acid monoglycol ester.

The polyacetals usable in the present thermoplastic resin compositions are crystalline thermoplastic resins, sometimes called polyoxymethylene (POM). Suitable polyacetals are, for example, the compounds obtainable from the reaction of glycols, such as diethylene glycol, triethylene glycol, 4,4'-dioxetboxy diphenyl dimethyl methane and hexane diol, with formaldehyde. Polyacetals suitable for use in accordance with the present invention may also be obtained by the polymerization of cyclic acetals. Other specific examples of polyacetals include formaldehyde homopolymers and copolymers of trioxane (i.e., trimer of formaldehyde) and a small amount of cyclic ethers such as ethylene oxide and 1,3-dioxane.

Chain extension of the polycondensates may be accomplished through any conventional mean, many of which are known in the art. For example, chain extension of the polycondensates may be accomplished through dry tumbling together or cofeeding a chain extender with a desired polycondensate. The chain extender may then be melt or solution blended with the polycondensate by methods well known in the art, such as by reactive extrusion. In addition, other suitable formulation ingredients such as pigments, fillers, reinforzants, or additives such as stabilizers, antioxidants, lubricants, and/or any other additives known in the art needed for specific applications may be added to the formula in typical amounts. Examples of suitable reactors for reactive extrusion include single and twin screw extruders systems, of different screw designs, configurations, L/D and compression ratios, operating at suitable RPM's to provide the prescribed average residence times at known feed rates. Other suitable reactors include Banbury mixers, Farrell continuous mixers, Buss co-kneaders, and roll mills. These systems may operate at temperatures above the $T_g$ of the chain extender and above the $T_g$ and/or $T_m$ of the polycondensate in what is known in the art as reactive extrusion. The average residence time in the reactor may vary, but the chain extenders of the present invention need only short residence times compared to other presently available chain extenders. Typically, the residence times will range from about 0.5 to about 15 minutes. This includes embodiments where the residence time is from about 1 minute to about 10 minutes and further includes embodiments where the residence time is from about 2 minutes to about 7 minutes.

The chain extending operations can be followed by plastic forming operations such as extrusion, molding and fiber spinning. The reactive extrusion can also take place within primary processing equipment without pre-compounding. Alternatively, the compounding may be followed by a finishing step such as solid state polymerization and may be processed in any reactor system and configuration operating at temperatures above the $T_g$ of the chain extender and between the $T_g$ and $T_m$ of the polycondensate for an average residence time between 1 and 24 hours, including from 2 to 18 hours, and further including 3 to 12 hours. Examples of suitable reactors for solid state polymerization are well know in the art, and operational modes of the same include batch, semi-batch and continuous solid state polymerization. In one embodiment, the blend, co-feed, or separate-feed is processed in a combination process comprising suitable arrays of reactive extrusion and solid state polymerization processes known in the art, operating within the ranges given above, and in which chain extender may be added to either or both stages.

Processing may be followed by a polymer recovery and a pelletization stage to obtain pellets or granules of the chain extended polycondensates suitable for further processing.

Because the chain extenders provide low EEWs they are effective even in very small quantities. In some embodiments of the invention, the chain extender is present in an amount of about 5% (w/w) or less, about 3% (w/w) or less, about 2% (w/w) or less, about 1% (w/w) or less, and even about 0.5% (w/w) or less, based on the total weight of the mixture. This includes embodiments where the chain extender is present in an amount of from about 0.01 to about 5% (w/w), based on total weight of the mixture, and further includes embodiments where the chain extender is present in an amount of from about 0.03 to 4%, or from about 0.05 to 2.5% (w/w) based on the total weight of the mixture. It follows that the condensation polymer may be present in an amount of up to 99.99% (w/w), 99.95% (w/w), 99.5% (w/w), 99% (w/w), 98% (w/w), 97% (w/w), or 95% (w/w) based on the total weight of the mixture.

The chain extenders of the present invention provide a number of processing advantages compared to other chain extenders. For example, pre-drying of the polycondensate is not required prior to chain extension. This is of particular commercial advantage as pre-drying adds cost and complexity to the process of recycling by requiring another process step as well as more time. In addition, unlike many of the chain extenders currently available, the chain extenders of the present invention do not require the addition of a catalyst or high vacuum operation in order to drive the reaction to the desired extent. This significantly reduces processing costs. Thus, in various embodiments of the invention, the chain-extended condensation polymers are substantially free of gel particles, are produced without pre-drying the condensation polymer, and are produced by reacting the chain extenders and the condensation polymers in a single stage of conventional equipment in the absence of additional catalyst and/or without vacuum operation. Furthermore, in some of these embodiments, the chain extended polycondensates obtained have molecular weights that are similar to or higher than those obtained through solid state polymerizaion, and have properties that are similar or even better than those obtained through solid state polymerization, thus allowing for the replacement of expensive and cumbersome solid state polymerization processes by simpler reactive extrusion processes.

The chain extenders of the present invention have demonstrated enhanced ability to restore or even improve the properties of reprocessed or recycled condensation polymers or of lower grade virgin, condensation polymers. The improvements provided by the chain extenders can be seen directly in the physical properties of the chain extended condensation polymers compared to the same properties in the unmodified low grade virgin condensation polymers or reprocessed or recycled condensation polymers. The efficacy of chain extension and molecular weight increase can be assessed in a number of different ways. Some common methods for the assessment of chain extension are change in melt viscosity, which may be measured by capillary rheometry, melt flow index (MFI), cone-and-plate or parallel plate rheometry. Other common methods are based on changes in solution viscosity, which may be measured for example by Ostwall-Fenske or Ubbelohde capillary viscometers as changes in relative, inherent, or intrinsic viscosity (I.V.).

The chain extenders of the present invention are very effective at increasing the molecular weight of reprocessed or recycled condensation polymers. This is evidenced by the increase in the intrinsic viscosity of the condensation polymers following chain extension. For example, in some instances the chain extenders may increase the intrinsic viscosity of the chain extended condensation polymer back to within 15% of the intrinsic viscosity of the condensation polymer prior to recycling or reprocessing, where intrinsic viscosity is measured according to ASTM D-2857. This includes embodiments where the intrinsic viscosity of the chain extended condensation polymer may increase back to within 10% of the intrinsic viscosity of the condensation polymer prior to recycling or reprocessing, and further includes embodiments where the intrinsic viscosity of the chain extended condensation polymer may increase back to within 5% of the intrinsic viscosity of the condensation polymer prior to recycling or reprocessing.

In some cases, the intrinsic viscosity of the chain extended condensation polymers is actually higher than the initial intrinsic viscosity of the condensation polymers before they underwent recycling or reprocessing. This includes embodiments where the intrinsic viscosity of the chain extended condensation polymer is increased by at least 2%, at least 5%, at least 10%, at least 20%, at least 30%, at least 40%, and even at least 50% with respect to the condensation polymer from which the recycled or reprocessed condensation polymer was produced. In some instances the chain extenders may increase the intrinsic viscosity of the chain extended condensation polymers, as described above, without any need from pre-drying the condensation polymer, catalyst, vacuum operation, or solid state polymerization steps.

The increase in the viscosity of the condensation polymers following chain extension may also be measured by melt viscosity as measured by capillary rheometry. For example, in some instances the chain extenders may increase the melt viscosity of the chain extended condensation polymer as measured by capillary rheometry at 100 s$^{-1}$, by up to 300% relative to the initial post-processing melt viscosity of the condensation polymer. This includes embodiments where this increase in melt viscosity is realized without the need for any pre-drying of the condensation polymer, catalyst, vacuum operation, or solid state polymerization steps.

The increase in the molecular weight of the condensation polymers following chain extension is also demonstrated by the decrease in the melt flow index (MFI) of the condensation polymer after chain extension has occurred. For example, in some instances the melt flow index (MFI) of the chain extended condensation polymer, as measured by ASTM-D-1238, may be only about 60% or less of the MFI of the reprocessed or recycled condensation polymer or of the initial MFI of a low grade condensation polymer. This includes embodiments where this decrease in MFI is realized in a melt blending process without the need for any pre-drying of the condensation polymer, catalyst, vacuum operation, or solid state polymerization steps.

Due to their ability to provide recycled or processed materials with properties equivalent to those of the un-recycled or un-processed materials, the chain extenders of the present invention have the advantage that more of the recycled or reprocessed material can be incorporated into the final product. The chain extenders have the further advantage that the mechanical, thermal and impact properties of chain extended polycondensates are not negatively impacted and in many instances are enhanced with respect to those of the un-recycled or un-processed polycondensates.

The chain extenders may be used with lower grade virgin polycondensates in order to make such polycondensates suitable for uses which they otherwise would not be. For example, a chain extended lower grade condensation polymer, such as a polyester, according to the invention, may have an intrinsic viscosity that permits the polymer to be used in more demanding application. This includes embodiments where the intrinsic viscosity of the chain extended lower grade condensation polymer is increased by at least 2%, at least 5%, at least 10%, at least 20%, at least 30%, at least 40%, and even at least 50% by reaction with a chain extender. "Lower grade" polycondensate, as used herein, means a resin grade with comparatively lower molecular weight with respect to other grades in the same chemical family, exhibited as lower I.V., or lower melt viscosity at given conditions, which also results in lower physical properties than the other grades in the same family.

Applications of this invention include, but are not limited to, recycling of scrap plastics, such as polyesters, polycarbonates, polyamides, and blends and alloys of scrap plastics by either a reactive extrusion or a solid state polymerization process of this invention, and post-processing of the recycled material through extrusion/blow molding into various articles including, but not limited to, food or non-food contact containers and transparent colored applications, films, coatings, tapes, moldings, fibers, strapping and other consumer products.

In general the epoxy-functional oligomeric or polymeric chain extenders of this invention show storage stability, safety of handling, no need for catalysts for effective chain extension, resistance to hydrolysis, and low volatility. The chain extenders may take the form of solids, or low viscosity liquids, or easy to handle wax forms.

INDUSTRIAL APPLICABILITY

The chain extenders of this invention provide several benefits in a variety of applications. These chain extenders when used by PET resin manufacturers provide intrinsic viscosity enhancement in single reactive steps with no need for or shorter solid state time, improvement in melt strength, improvement in compatibility with other types of plastics, aid in processing due to reduced need for drying, and can act as acetaldehyde scavengers. These chain extenders can be used in single reactive extrusion equipment as substitutes for solid state polymerization in recycling of PET. Compounders can benefit from the improved compatibility with other types of plastics, such as other polyesters, polycarbonates, polyamides, etc. Converters can benefit from improved extrusion blow molding and melt strength, injection blow-molding, crystallinity and toughness in blow molding operations. In foamed sheets benefits can be expected due to the countered effects of endothermic foaming agents. In industrial fabrics the use of these chain extenders can improve coating adhesion, tenacity and melt strength. Use of these chain extenders in tire cord can provide improved coating adhesion, acid neutralization and metal complexation. In films, these chain extenders can provide improved toughness, improved melt strength and higher draw-down ratios. For fiber producers, the chain extenders of the disclosed invention can provide improved tensile strength and improved dyeability when using disperse, acid or basic dyes. In certain exemplary embodiments where the condensation polymer is a polyester, the chain extender may contain about 50% to about 80% by weight of at least one epoxy-functional (meth)acrylic monomer based on the total weight of the monomers and between about 20% and about 50% by weight of at least one styrenic and/or (meth)acrylic monomer.

These chain extenders also have several benefits when used with polycarbonates. PC resin manufacturers can benefit from molecular weight enhancement, branching agent-notch sensitivity and improved compatibility for alloys with PET, PBT, polyamides, etc. The recyclers of PC can reclaim CD and digital video disks (DVD) for engineering applications and may also benefit due to the stabilization of mixed source regrind due to the acid scavenging and metal chelating properties of the chain extenders. Compounders of PC can benefit due to improved compatibility with other types of plastics as well as due to an upgrade of high flow resins. Plastic converters can benefit from aid in processing for long dwell time moldings, reduced sensitivity to residual moisture, structural foamed parts with endothermic foaming agents, improved melt strength for extrusions and reduced sensitivity to metals (pigments, waxes). In certain embodiments where the condensation polymer is a polycarbonate, the chain extender may contain about 45% to about 80% by weight of at least one epoxy-functional (meth)acrylic monomer based on the total weight of the monomers and between about 20% and about 55% by weight of at least one styrenic and/or (meth)acrylic monomer.

In the area of polyamide resin manufacture the chain extenders of this invention provide enhancement of inherent viscosity, improved compatibility for alloys with PET, PC, PBT, POM, etc., and dimensional stability. For compounders of polyamide resins, these chain extenders improve compatibility for alloys, upgrade hydrolyzed material and aid in processing by reducing the need to pre-dry the polymer. These chain extenders allow recycling of mixed carpet waste of PET and PA. For converters of PA, these chain extenders improve fiber tenacity, improve coating adhesion for tire cord, improve wear resistance and act as dye coupling agents. In certain embodiments where the condensation polymer is a polyamide, the chain extender may contain 25% to about 55% by weight of at least one epoxy-functional (meth)acrylic monomer based on the total weight of the monomers and between about 45% and about 75% by weight of at least one styrenic and/or (meth)acrylic monomer.

In post-reaction finishing of POM resins, these chain extenders can act as formaldehyde scavengers, acid scavenger-process aids, secondary scavenger and branching agents to control crystallization, provide benefits in reduced warpage and shrinkage and improve toughness and wear resistance. Compounders of POM resins can benefit from these chain extenders due to their ability to acts as process aids (acid scavengers), formaldehyde scavengers, fiberglass coupling agents, coupling agents for impact modifiers and chelators for metals (pigments, waxes). The converters of POM resins also benefit from the chain extenders of this invention due to their ability to act as process aids and formaldehyde scavengers and their ability to improve wear resistance, melt strength for extruded profiles, and paint and metallization adhesion.

For the manufacturers of PBT resins, the chain extenders of this invention provide enhancement of inherent viscosity without solid state polymerization and compatibilization for alloys. These chain extenders benefit the compounders of PBT resins due to the use of lower cost impact modifiers and reduced moisture sensitivity during processing. For converters of PBT resins, these chain extenders act as process aids by improving melt viscosity. In some embodiments, these resins may also chelate metals.

In the manufacture of TPU resins, the chain extenders of this invention act as crosslinkers for magnetic tape coatings and as process aid to minimize moisture damage. For the compounders of TPU resins, these chain extenders provide benefits in ether-ester alloys, PVC, NBR, etc., and act as process stabilizers and as fiberglass coupling agents. The converters of TPU resins can benefit from the upgrade of edge-trim/regrind, improved melt strength of fibers and blown film, improved adhesion to metals and fabrics, and foamed parts/sheet with endothermic chemical foaming agents.

The invention is described in greater detail in the following, non-limiting examples.

EXAMPLES

Preparation of Chain Extenders I

Five different epoxy-functional chain extenders, labeled Chain Extender A–E below, were designed and prepared in a 2 gal free radical continuous polymerization reactor system according to the teachings of U.S. Publication No. US20030191261A, and U.S. Pat. No. 6,552,144. The specific synthesis conditions and chain extender characterization parameters are given in Table 1 below. The abbreviations used below are defined as follows, STY=styrene, BMA=butyl methacrylate, MMA=methyl methacrylate, GMA=glycidyl methacrylate.

TABLE 1

| | Chain Extenders | | | | |
|---|---|---|---|---|---|
| | Chain Extender A | Chain Extender B | Chain Extender C | Chain Extender D | Chain Extender E |
| STY | 24.55 | 32.22 | 67.78 | 32.22 | 67.78 |
| BMA | 33.25 | — | — | — | — |
| MMA | 17.07 | — | — | — | — |
| GMA | 25.13 | 67.78 | 32.22 | 67.78 | 32.22 |
| Total | 100.00 | 100.00 | 100.00 | 100.00 | 100.00 |
| Reaction Temp (° C.) | 171 | 188 | 188 | 210 | 210 |
| Residence Time (min) | 15 | 18 | 18 | 18 | 18 |
| EEW | 565.66 | 209.72 | 441.19 | 209.72 | 441.19 |
| Efw | 36.48 | 24.20 | 24.52 | 12.09 | 12.52 |
| Efn | 8.06 | 9.92 | 9.15 | 6.40 | 5.51 |
| PDI | 4.53 | 2.44 | 2.68 | 1.889 | 2.273 |
| $M_n$ | 4557 | 2081 | 4036 | 1342 | 2431 |
| $M_w$ | 20634 | 5076 | 10819 | 2535 | 5525 |
| $T_g$ | 46 | 39 | 67 | 22 | 56 |
| Polarity (as % oxygen) | 21.4 | 22.9 | 10.9 | 22.9 | 10.9 |

Example 1

Virgin PET of Intrinsic Viscosity (I.V.)=0.75 dL/g (Eastapak 7352 from Eastman Chemicals) was processed through a single extrusion step with and without the use of a chain extender. The extruder employed is a 30 mm, twin-screw, with 5 temperature zones plus die, operating at $T_1$ to $T_n$=280° C., and 200 RPM. The PET was used without pre-drying, no vacuum was employed during processing, and no catalyst was employed.

Three chain extenders of this invention designed and prepared according to the process described above were evaluated at different loads against a large number of leading chain extenders known in the art. In each case the given amount of chain extender was pre-mixed by dry blending to homogeneity with the PET pellets before the mix was fed at constant rate into the extruder.

The I.V. results of the final compounds are given in Table 2 below. The PET undergoes a marked molecular weight degradation during the prescribed processing step starting from an I.V. of 0.750 dL/g before processing and decreasing to 0.543 dL/g after extrusion.

In all cases the PET employed was Virgin Eastapak 7352 of I.V.=0.75 dL/g from Eastman.

TABLE 2

Evaluation of Chain Extenders with PET

| Chain Extender | Source | Chain-Ext. Concentration (% w/w) | Product I.V. (dL/g) |
|---|---|---|---|
| None | Unprocessed control | 0 | 0.750 |
| None | Processed control | 0 | 0.543 |
| EPON ™ 1001F | Shell | 2.5% | 0.513 |
| EPON ™ 1001F | Shell | 5.0% | 0.481 |
| Epoxidized Soybean Oil (ESO) | CP Hall | 2.0% | 0.548 |
| ESO | CP Hall | 2.5% | 0.583 |
| CYRACURE ™ UVR6128 | Union Carbide | 1.5% | 0.534 |
| CYRACURE ™ UVR6128 | Union Carbide | 3.0% | 0.508 |
| STABAXOL ™ KE7426 | Bayer | 5.0% | 0.577 |
| STABAXOL ™ P200 | Bayer | 1.0% | 0.581 |
| ERL-4221 | Union Carbide | 1.5% | 0.518 |
| ERL-4221 + ESO (1:1) | Union Carbide | 3.0% | 0.526 |
| IRGAFOS ™ 168 | Ciba Specialty Chem. | 0.25% | 0.521 |
| IRGAFOS ™ 168 | Ciba Specialty Chem. | 0.50% | 0.546 |
| IRGAFOS ™ 168 | Ciba Specialty Chem. | 0.75% | 0.554 |
| IRGAFOS ™ 168 | Ciba Specialty Chem. | 1.0% | 0.558 |
| IRGAFOS ™ 168 | Ciba Specialty Chem. | 2.0% | 0.562 |
| Chain Extender A, (Example 1) | | 2.0% | 0.580 |
| Chain Extender C, (Example 1) | | 2.0% | 0.674 |
| Chain Extender B, (Example 1) | | 2.0% | 0.820 |

The abbreviations in Table 2 and other tables below are defined as follows: EPON™ 1001F=Solid bis-phenol A glycidyl ether epoxy resin. CYRACURE™ UVR6128=a cycloaliphatic epoxy resin. STABAXOL™ KE7426= polymeric carbodiimide. STABAXOL™ P200=a liquid carbodiimide. ERL-4221= a cycloaliphatic epoxy resin. IRGAFOS™ 168=(2,4-di-tert-butyl phenyl) phosphite.

From these results it is absolutely clear that no noticeable chain extension was achieved with any of the current art products tested under the prescribed conditions. In contrast, all three tested chain extenders of this invention caused a substantial increase in the final I.V. of the material, increasing it to values from lower to higher than the value of the starting virgin material even at chain extender loads as low as 2% w/w. In each case the product was substantially gel-free.

Example 2

Virgin PET of Intrinsic Viscosity (I.V.)=0.75 dL/g (EASTAPAK™ 7352 from Eastman Chemicals) was processed through a single extrusion step with and without the use of chain extender. The different zone and die temperatures and extruder RPM's were adjusted to maximize the I.V. of the product and are shown in Table 3 below.

In this case the PET was pre-dried from an initial moisture value of 0.0947% to a final value lower than the detection limit of the equipment. No vacuum was employed during processing, and no catalyst was employed.

Three chain extenders of this invention were evaluated at 2% w/w against the current art chain extender showing best performance in example 1. In each case the given amount of chain extender was pre-mixed by dry-blending to homogeneity with the PET pellets before the mix was fed at constant rate into the extruder.

The Intrinsic Viscosity (I.V.) results of the final compounds are given in Table 3 below. Notice the marked molecular weight degradation in the pre-dried PET control during the prescribed processing step, starting from an I.V. of 0.750 dL/g before processing and decreasing to 0.592 dL/g after extrusion.

TABLE 3

Processing of Dried PET

| Sample ID | Chain Extender Package | Extruder Temperature (5 Zones & die, ° C.) | Extruder rpm | I.V. (dL/g) |
|---|---|---|---|---|
| Virgin EASTAPAK ™ 7352 PET Natural | None | unprocessed | — | 0.750 |
| Dried EASTAPAK ™ 7352 PET Natural | None | 260-260-250-245-240-250 | 220 | 0.592 |
| PET (A-1) Dried | 2% ESO | 260-260-250-245-240-250 | 220 | 0.654 |
| PET (B-1) Dried | 2% Chain Extender B, Example 1 | 320-290-300-295-290-280 | 195 | 0.832 |
| PET (C-1) Dried | 2% Chain Extender C, Example 1 | 260-290-300-295-290-280 | 150 | 0.724 |
| PET (D-1) Dried | 2% Chain Extender A, Example 1 | 290-290-290-290-290-285 | 160 | 0.677 |

From these results it is clear that very limited chain extension was achieved with the current art chain extender tested under the prescribed conditions. In contrast, all three tested chain extenders of this invention caused a substantial increase in the final I.V. of the material, increasing it to values from lower to similar to higher than the value of the starting virgin material even at chain extender loads as low as 2% w/w. No gel was observed in any of the products.

Example 3

Virgin PET of Intrinsic Viscosity (I.V.)=0.83 dL/g (MELI-NAR™ Laser C B95A, DuPont Chemical Company) was processed using a Brabender Plasti-Corder. The PET was processed for 10 minutes at temperatures of 260° C. and 280° C. and at a constant speed of 50 rpm. The PET was used without pre-drying, catalyst, or vacuum during processing.

Three chain extenders of this invention (B, D, and E) designed and prepared according to the process described above were evaluated at two temperatures (260° C. and 280° C.) and two levels (0.5 and 2.0% as w/w in mix). In each case the given amount of chain extender was pre-mixed to homogeneity with the PET using a Strand Mixer before the blend was fed into the mixing chamber. Examples of torque vs. time traces are shown in FIG. 1. Values of interest are maximum torque following melting (Max. Torque, Inch Pounds—IP), time to maximum torque, and torque at three (Torque-1), five (Torque-2), and seven minutes (Final Torque). In this set of experiments torque is directly related to the melt viscosity, which is related to its molecular weight. That is, greater torque is required to stir high molecular weight PET materials.

The maximum torque following melting (Max. Torque, Inch Pounds—IP), time to maximum torque, and torque at three (Torque-1), five (Torque-2), and seven minutes (Final Torque) are recorded in Table 4 below for the modified and unmodified PET samples at the temperatures and levels discussed above. From these results it is clear that all three of the tested chain extenders of this invention caused significant increases in the torque required to mix the PET samples reflecting an increase in the polymer molecular weight. The maximum torque increased with the level of modification and reaction temperature. The torque at three, five, and seven minutes increased with the level of modification and decreased with temperature. No gel was observed in any of the products.

In all cases the PET employed was Virgin MELINAR™ Laser C B95 2 of I.V.=0.83 dL/g from DuPont.

TABLE 4

Evaluation of Chain Extenders

| Chain Extender | Level (%) | Temperature (° C.) | Torque (IP) | | | | |
|---|---|---|---|---|---|---|---|
| | | | Max | Time to Max | 3 min | 5 min | 7 min |
| None | 0 | 260 | NA | NA | 10.52 | 5.54 | 2.51 |
| None | 0 | 280 | NA | NA | 7.66 | 2.20 | 2.86 |
| B | 0.5 | 260 | 68.07 | 1.37 | 38.41 | 19.71 | 12.45 |
| B | 0.5 | 280 | 59.09 | 1.03 | 15.58 | 4.71 | 4.49 |

TABLE 4-continued

Evaluation of Chain Extenders

| Chain Extender | Level (%) | Temperature (° C.) | Torque (IP) | | | | |
|---|---|---|---|---|---|---|---|
| | | | Max | Time to Max | 3 min | 5 min | 7 min |
| B | 2 | 260 | 169.49 | 1.53 | 107.32 | 67.94 | 47.26 |
| B | 2 | 280 | 219.52 | 1.07 | 86.33 | 44.40 | 37.36 |
| D | 0.5 | 260 | 71.32 | 1.50 | 43.74 | 19.98 | 12.01 |
| D | 0.5 | 280 | 50.16 | 1.17 | 17.86 | 6.38 | 1.85 |
| D | 2 | 260 | 172.30 | 1.70 | 110.09 | 64.99 | 46.29 |
| D | 2 | 280 | 175.47 | 1.17 | 63.40 | 32.16 | 25.78 |
| E | 2 | 280 | 61.20 | 1.50 | 36.39 | 15.71 | 8.67 |

Example 4

Virgin PET of Intrinsic Viscosity (I.V.)=0.83 dL/g (MELI-NAR™ Laser C B95A, DuPont Chemical Company) was processed using a Brabender Plasti-Corder which consisted of a 100-ml mixing chamber. The PET was processed for 10 minutes at 280° C. and at a constant speed of 50 rpm. The PET was used without pre-drying, catalyst, or vacuum during processing.

Figure 2:
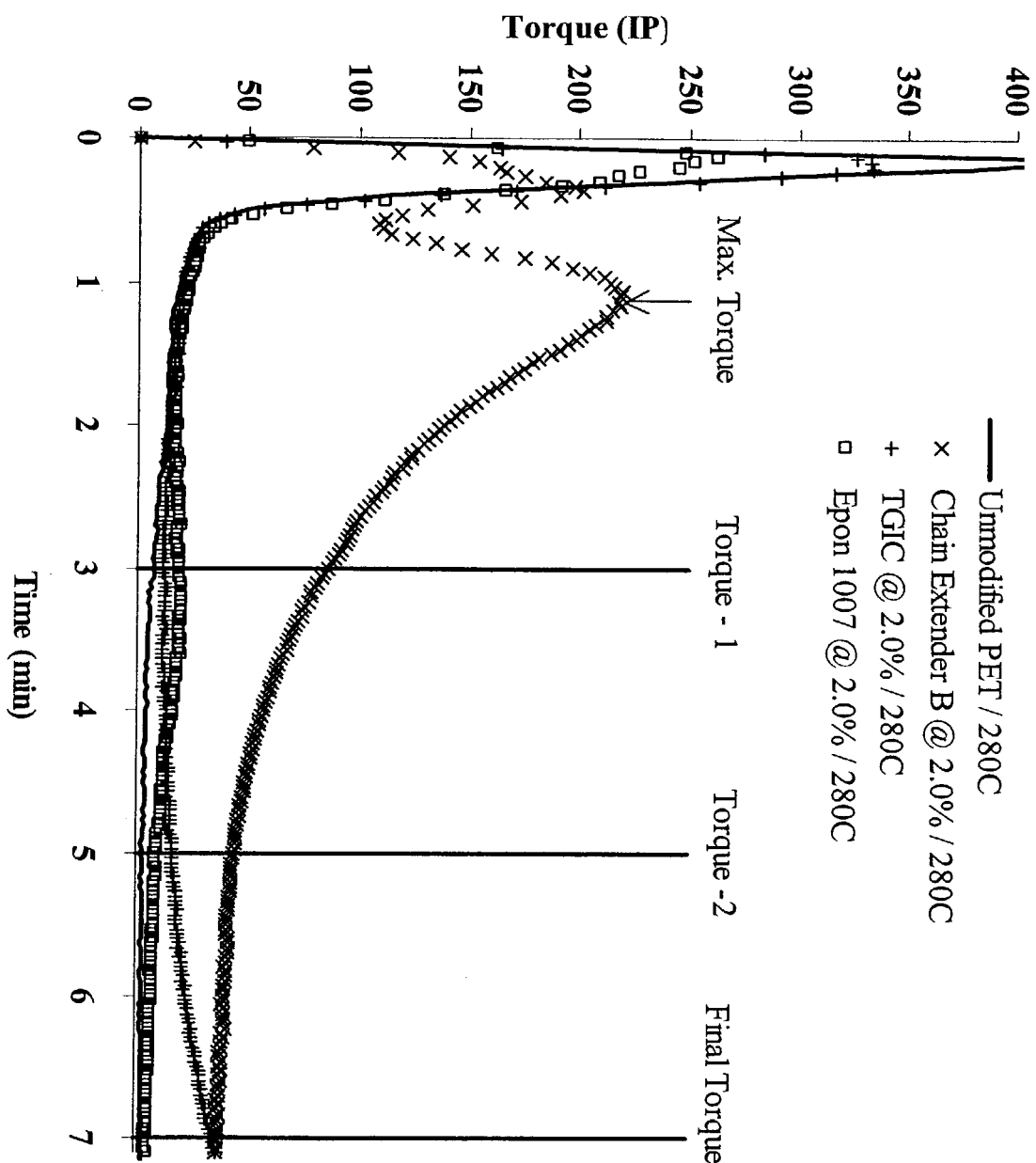
FIG. 2. Examples of torque vs. time traces for virgin PET and PET modified with chain extender B and existing chain extenders (TGIC, triglycidyl isocyanurate and EPON® 1007, bisphenol A epoxy resin). Values of interest are maximum torque following melting (Max. Torque, Inch Pounds—IP), time to maximum torque, and torque at three (Torque-1), five (Torque-2), and seven minutes (Final Torque). Torque is directly related to melt viscosity which in turn is directly related to molecular weight.

One chain extender of this invention (B), designed and prepared according to the process described above, that showed the best performance in example 3 was evaluated against two current art chain extenders at 280° C. and at 2% w/w load. In each case the given amount of chain extender was pre-mixed to homogeneity with the PET using a Strand Mixer before the blend was fed into the mixing chamber. Examples of torque vs. time traces are shown in FIG. 2. Values of interest are maximum torque following melting (Max. Torque, Inch Pounds—IP), time to maximum torque, and torque at three (Torque-1), five (Torque-2), and seven minutes (Final Torque). In this set of experiments torque is directly related to the blend viscosity, which is related to polymer molecular weight. That is, greater torque is required to mix high molecular weight PET materials.

The maximum torque following melting (Max. Torque, Inch Pounds—IP), time to maximum torque, and torque at three (Torque-1), five (Torque-2), and seven minutes (Final Torque) are recorded in Table 5 below for the modified and unmodified PET samples at the conditions described above. From these results it is clear that no noticeable chain extension occurred with the current art chain extenders during typical processing times of less than five minutes. On the other hand, chain extender B of this invention caused a significant increase in the torque required to mix the chain extended PET.

TABLE 5

Evaluation of Chain Extenders

| Chain Extender | Level (%) | Temperature (° C.) | Torque | | | | |
|---|---|---|---|---|---|---|---|
| | | | Max | Time to Max | 3 min | 5 min | 7 min |
| Control (none) | 0 | 280 | NA | NA | 7.66 | 2.20 | 2.86 |

TABLE 5-continued

Evaluation of Chain Extenders

| Chain Extender | Level (%) | Temperature (° C.) | Torque Max | Time to Max | 3 min | 5 min | 7 min |
|---|---|---|---|---|---|---|---|
| B (This Invention) | 2 | 280 | 219.52 | 1.07 | 86.33 | 44.40 | 37.36 |
| TGIC | 2 | 280 | 35.95 | 7.00 | 11.57 | 16.55 | 35.95 |
| Epon 1007 | 2 | 280 | 19.40 | 3.30 | 18.70 | 7.96 | 3.70 |

In all cases the PET employed was Virgin MELINAR™ Laser C B95 2 of I.V.=0.83 dL/g supplied by DuPont.

Example 5

The twin-screw extruder described in Examples 1 and 2 was used to process polycarbonate (MAKROLON™ 2508 from Bayer) at 300° C., with and without chain extender B of this invention. The polycarbonate and chain extender B were dry blended to homogeneity and then fed to the extruder. Three different concentrations of chain-extender were employed. No pre-drying, vacuum or catalyst was employed in any example. The melt-flow index (MFI) of the processed polycarbonate was measured in a plastiometer at 300° C. per 1.2 Kg. Comparative results are given in Table 6. The increase in MFI of the processed polycarbonate in comparison with that of the un-processed control was caused by molecular weight degradation. This MFI increase is overcome by use of 0.5% w/w of chain extender B. Higher levels of chain extender are more effective in increasing molecular weight as judged from decrease in MFI.

TABLE 6

Chain Extenders in Polycarbonate

| Chain Extender | Level of Use, % | Head Pressure, psi | Torque | MFI, 300° C./ 1.2 kg/ 10 min | MFI, % Change |
|---|---|---|---|---|---|
| None (control) | Unprocessed | — | — | 14.6 | — |
| None (control) | — | 500 | 60% | 15.7 | 7.5 |
| B (Example 1) | 0.5 | 580 | 60% | 14 | −4.1 |
| B (Example 1) | 1.0 | 620 | 62% | 11.7 | −19.9 |
| B (Example 1) | 2.0 | 560 | 58% | 10.3 | −29.5 |

Example 6

The twin-screw extruder described in Examples 1 and 2 was used to process four different grades of PET by dry-blending with chain extender B of this invention at loadings of 1 and 2% by weight. No pre-drying, vacuum or catalyst was employed. The melt viscosity of resulting blends was compared with those of the controls containing no chain extender with a capillary viscometer at 280° C. and two different shear rates. Results given in Table 7 show significant increase in melt viscosity at both levels of chain extender of this invention. The melt viscosity values at 1000 s$^{-1}$ show an enhanced shear thinning for the chain extended materials of this invention.

TABLE 7

Evaluation of Chain Extenders in PET

| PET Used | Level of Chain Extender B, wt. % | Melt Viscosity (Pa-sec) @ 100 s$^{-1}$ | Melt Viscosity (Pa-sec) @ 1000 s$^{-1}$ | Change in Melt Viscosity (Pa-sec) |
|---|---|---|---|---|
| DAK 5122C | 0 (control) | 110 | 99 | 11 |
| | 1.0% | 159 | 89 | 70 |
| | 2.0% | 176 | 63 | 113 |
| KOSA 3302 | 0 (control) | 89 | 80 | 9 |
| | 1.0% | 190 | 118 | 72 |
| | 2.0% | 183 | 81 | 102 |
| DAK Laser Plus | 0 (control) | 122 | 114 | 8 |
| | 1.0% | 238 | 128 | 110 |
| | 2.0% | 160 | 73 | 87 |
| EASTAPAK 7352 | 0 (control) | 89 | 71 | 18 |
| | 1.0% | 161 | 101 | 60 |
| | 2.0% | 179 | 78 | 101 |

Preparation of Chain Extenders II

Two different epoxy-functional chain extenders, labeled Chain Extender F and G below, were designed and prepared in a 2 gal free radical continuous polymerization reactor system operated in continuous recycle mode according to the teachings of U.S. patent application Ser. No. 09/354,350. The specific synthesis conditions and chain extender characterization parameters are given in Table 8 below. The abbreviations used below are defined as follows: STY=styrene, BMA=butyl methacrylate, MMA=methyl methacrylate, GMA=glycidyl methacrylate.

TABLE 8

Chain Extenders Synthesis II

| | Chain Extender F | Chain Extender G |
|---|---|---|
| Fresh Feed to CSTR | | |
| STY | 90.70 | 47.08 |
| MMA | 0.98 | 1.00 |
| GMA | 5.1 | 48.77 |
| Aromatic-100 | 0.97 | 1.77 |
| DTBP | 2.25 | 1.38 |
| Process Conditions | | |
| Recycle/Fresh Feed | 10/90 | 20/80 |
| Reaction Temp (° C.) | 240 | 193 |
| Residence Time (min) | 12 | 15 |
| Purge/Recycle | 20/80 | 10/90 |
| Product Characteristics | | |
| EEW | 2800 | 285 |
| Efw | 1 | 25.8 |
| Efn | 0.5 | 9.7 |
| PDI | 1.9 | 2.7 |
| $M_n$ | 1500 | 2700 |
| $M_w$ | 2900 | 7300 |
| $T_g$ | 56 | 52 |
| Polarity (as % oxygen) | 2.1 | 17.3 |

Example 7

Controlled Chain Extension of Bottle Grade Processed PET for Specific Enhanced Applications Compositions comprising 98 to 99.7 parts of virgin PET of low Intrinsic Viscosity (I.V.)=0.8 dL/g (Eastapak 9921 W from Eastman Chemicals) was dry-blended and then processed through a single extrusion step with 0.3 to 2.0 parts of chain extender G of this invention. The extruder employed was a Maris-30, co-rotating 30 mm twin-screw operating at T=290° C. and 200 RPM. No vacuum was employed during processing, and no catalyst was employed.

Specific formulations were designed to enhance the I.V. of the final product to the typical levels necessary for use in more demanding applications, thus allowing this initially lower degraded I.V. feedstock to be used in such applications otherwise not accessible due to their low properties.

The Intrinsic Viscosity (I.V.) results of the final compounds were measured using a method adapted from ASTM D 4603-86, employing a Ubbelholde viscometer series 1, and 60/40 Phenol/1,1,2,2 tetrachloroethane % (w/w) as solvent. Results are given in Table 9 below. Large increases in I.V. are observed allowing the application of the corresponding chain extended grades in applications previously only reached with much higher initial I.V. PET resins.

Preparation of Chain Extender Pre-Dilutions I

To facilitate mixing of the chain extenders of this invention in processing steps where traditionally insufficient mixing is achieved, such as injection molding and some single screw extrusion operations, several pre-dilutions (PD) were made by mixing 20 to 60 parts of chain extender G with 80 to 40 parts of different suitable diluents. The description of these pre-dilutions is given below in Table 10.

TABLE 10

| | Chain Extender Pre-dilutions | | | | | | | |
|---|---|---|---|---|---|---|---|---|
| | PD O | PD P | PD Q | PD R | PD S | PD X | PD Y | PD Z |
| Chain Extender G (%) | 60 | 60 | 60 | 50 | 50 | 20 | 20 | 20 |
| Diluent (%) | 40 | 40 | 40 | 50 | 50 | 80 | 80 | 80 |

Example 8

Applications in Injection-Molding

Compositions comprising 98 to 99.5 parts of high I.V. virgin PET (Eastapak EN-001 I.V.=0.75 from Eastman

TABLE 9

Enhanced Applications of Chain Extended PET Starting from Low I.V. Grades

| Formulation | Product I.V. (dL/g) | Typical Application | I.V. Range Needed for Application (dL/g) |
|---|---|---|---|
| PET (Eastapak 9921 W) Unprocessed | 0.8 | — | — |
| PET (Eastapak 9921 W) Processed | 0.625 | Fiber-Staple, Filament | 0.62–0.64 |
| PET (Eastapak 9921 W) + 0.3% Chain Extender G | 0.683 | Sheet and Tape | 0.65–0.72 |
| PET (Eastapak 9921 W) + 0.5% Chain Extender G | 0.705 | Non-Food Bottles | 0.72–0.74 |
| PET (Eastapak 9921 W) + 1.0% Chain Extender G | 0.776 | 1. Strapping, general purpose packaging | 0.75–0.80 |
| | | 2. Beverage bottles Mineral Water | 0.78–0.82 |
| | | 3. Beverage Bottles CSD | 0.82–0.85 |
| PET (Eastapak 9921 W) + 1.5% Chain Extender G | 0.996 | Strapping, High-Tensile | 0.90–0.95 |
| PET + 2.0% Chain Extender G | Too high to measure | — | — |

From these results it can be seen that typical low I.V. grades of PET normally used in less demanding fiber applications when formulated with about 0.3% of chain extender G can be used in sheet and tape, when formulated with about 0.5% of chain extender G can be used in non-food bottles, when formulated with about 1.0% of chain extender G can be used in general purpose packaging strapping, and in food grade bottles including CSD bottles, and when formulated with about 1.5% of chain extender G can be used in high-tensile strapping applications.

Chemicals) which were either pre-dried or undried were mixed with 0.5 to 2 parts of several pre-dilutions containing varying amounts of chain extender G of this invention, and then processed through a single injection molding step. Injection molding was carried out in a Boy 50 injection molding machine with a clamping force of 50 metric tons, fitted with a 28-mm injection screw operating at T=280° C. No vacuum was employed during processing, and no catalyst was employed.

Comparative results of the mechanical properties of the moldings thus obtained are given below in Table 11.

TABLE 11

Comparative Evaluations of Chain Extended PET for Injection Molding Applications

| Physical Property | Test Method | Unit | PET control I.V. = 0.75 | PET + PD-P 0.5% | PET + PD-P 1.0% | PET + PD-Q 0.5% | PET + PD-Q 1.0% | PET + PD-R 0.6% | PET + PD-R 1.2% | PET + PD-S 0.6% | PET + PD-S 1.2% | PET + PD-O 1.0% | PET + PD-P 1.0% | PET + PD-R 2.0% | PET + PD-S 2.0% |
|---|---|---|---|---|---|---|---|---|---|---|---|---|---|---|---|
| | | | \<colspan PET Pre-dried\> | | | | | | | | | | | | |
| | | | Yes | Yes | Yes | Yes | Yes | Yes | Yes | Yes | Yes | No | No | No | No |
| | | | Moisture Content(%)* | | | | | | | | | | | | |
| | | | <0.05 | <0.05 | <0.05 | <0.05 | <0.05 | <0.05 | <0.05 | <0.05 | <0.05 | >0.1 | >0.1 | >0.1 | >0.1 |
| Flexural Modulus | ASTM D790 | MPa | 2497 | 2510 | 2497 | 2538 | 2497 | 2559 | 2566 | 2476 | 2510 | 2579 | 2566 | 2593 | 2559 |
| Flexural Strength | ASTM D790 | MPa | 82.1 | 82.1 | 81.4 | 82.1 | 82.1 | 84.8 | 83.4 | 81.4 | 81.4 | 85.5 | 85.5 | 85.5 | 84.1 |
| Izod Impact (notched) | ASTM D256 | J/m | 37.4 | 42.7 | 37.4 | 37.4 | 37.4 | 32.0 | 37.4 | 26.7 | 37.4 | 21.4 | 26.7 | 21.4 | 16.5 |
| Tensile Strength @ Yield | ASTM D638 | MPa | 51.3 | 53.7 | 53.7 | 51.9 | 52.6 | 53.6 | 53.2 | 52.8 | 52.2 | 53.9 | 54.3 | 55.2 | 54.1 |
| Elongation @ Yield | ASTM D638 | % | 3.5 | 3.8 | 3.6 | 3.6 | 3.6 | 3.7 | 3.6 | 3.5 | 3.6 | 3.5 | 3.7 | 3.7 | 3.5 |
| Young's Modulus | ASTM D638 | MPa | 2234 | 2379 | 2462 | 2414 | 2448 | 2497 | 2497 | 2483 | 2483 | 2352 | 2317 | 2386 | 2366 |

*Moisture analysis was carried out in a OmniMark Mark II loss-in-weigh analyzer.

Example 9

Applications in Injection-Molding from Virgin, Reprocessed or Recycled Very Low I.V. Feedstock Compositions comprising 97 to 99 parts of low I.V. virgin PET (Eastapak EN-058 I.V.=0.58 from Eastman Chemicals) which were either pre-dried, or partially pre-dried were mixed with 1 to 3 parts of several pre-dilutions containing varying amounts of chain extender G of this invention, and then processed through a single injection molding step. Injection molding was carried out at same conditions as in Example 8.

Comparative results of the mechanical properties of the moldings thus obtained are given below in Table 12.

TABLE 12

Comparative Evaluations of Chain Extended PET for Injection Molding Applications

| Physical Property | Test Method | Unit | PET control I.V. = 0.58 | PET + PD-O 1.0% | PET + PD-O 1.5% | PET + PD-Q 1.0% | PET + PD-Q 1.5% | PET + PD-R 1.2% | PET + PD-R 1.8% | PET + PD-S 1.2% | PET + PD-S 1.8% | PET + PD-R 2.0% | PET + PD-R 3.0% | PET + PD-S 2.0% | PET + PD-S 3.0% |
|---|---|---|---|---|---|---|---|---|---|---|---|---|---|---|---|
| | | | PET Pre-dried | | | | | | | | | | | | |
| | | | Yes | Yes | Yes | Yes | Yes | Yes | Yes | Yes | Yes | partial | partial | partial | partial |
| | | | Moisture Content(%)* | | | | | | | | | | | | |
| | | | <0.05 | <0.05 | <0.05 | <0.05 | <0.05 | <0.05 | <0.05 | <0.05 | <0.05 | 0.075 | 0.075 | 0.075 | 0.075 |
| Flexural Modulus | ASTM D790 | MPa | 2531 | 2545 | 2497 | 2517 | 2448 | 2566 | 2552 | 2586 | 2572 | 2524 | 2490 | 2510 | 2524 |
| Flexural Strength | ASTM D790 | MPa | 83.4 | 84.1 | 83.6 | 80.7 | 78.6 | 82.8 | 80.7 | 82.1 | 82.1 | 83.4 | 82.1 | 81.4 | 82.1 |
| Izod Impact (notched) | ASTM D256 | J/m | 10.7 | 16.0 | 16.0 | 10.7 | 26.7 | 21.4 | 26.7 | 21.4 | 26.7 | 25.1 | 21.4 | 29.9 | 29.9 |

TABLE 12-continued

Comparative Evaluations of Chain Extended PET for Injection Molding Applications

| | | | | | | | | | | | | | | | |
|---|---|---|---|---|---|---|---|---|---|---|---|---|---|---|---|
| | | | | | | | Formulation | | | | | | | | |
| | | | PET control I.V. = 0.58 | PET + PD-O 1.0% | PET + PD-O 1.5% | PET + PD-Q 1.0% | PET + PD-Q 1.5% | PET + PD-R 1.2% | PET + PD-R 1.8% | PET + PD-S 1.2% | PET + PD-S 1.8% | PET + PD-R 2.0% | PET + PD-R 3.0% | PET + PD-S 2.0% | PET + PD-S 3.0% |
| | | | | | | | | PET Pre-dried | | | | | | | |
| Physical Prop- | Test | | Yes | Yes | Yes | Yes | Yes | Yes | Yes | Yes | Yes | partial | partial | partial | partial |
| | | | | | | | | Moisture Content(%)* | | | | | | | |
| erty | Method | Unit | <0.05 | <0.05 | <0.05 | <0.05 | <0.05 | <0.05 | <0.05 | <0.05 | <0.05 | 0.075 | 0.075 | 0.075 | 0.075 |
| Tensile Strength @ Yield | ASTM D638 | MPa | 53.0 | 53.7 | 54.1 | 53.5 | 52.1 | 53.8 | 53.5 | 53.7 | 53.4 | 53.2 | 53.2 | 52.0 | 52.2 |
| Elonga- tion @ Yield | ASTM D638 | % | 3.7 | 3.6 | 3.6 | 3.5 | 3.5 | 3.6 | 3.6 | 3.8 | 3.6 | 3.7 | 3.5 | 3.5 | 3.5 |
| Young's Mod- ulus | ASTM D638 | MPa | 2379 | 2338 | 2400 | 2386 | 2366 | 2503 | 2455 | 2421 | 2407 | 2441 | 2462 | 2379 | 2414 |

*Moisture analysis was carried out in a OmniMark Mark II loss-in-weigh analyzer. Partial drying was to 0.075% +/− 0.025%

Example 10

Applications in Injection-Molding of PC

Compositions comprising 98.8 to 99.4 parts of virgin Polycarbonate (Lexan 141 from GE Plastics) were pre-dried to less than 0.02% moisture, then mixed with 0.6 to 1.2 parts of Pre-dilutions R and S containing 50% of chain extender G of this invention, and then processed through a single injection molding step. Injection molding was carried out in a Boy 50 injection molding machine with a clamping force of 50 metric tons, fitted with a 28-mm injection screw operating at T= 300° C. No vacuum was employed during processing, and no catalyst was employed.

Comparative results of the mechanical properties of the moldings thus obtained are given below in Table 13.

Example 11

Applications in Injection-Blow Molding of PET Bottles from Low I.V. Feedstock

This example shows that with the aid of the chain extenders of this invention, PET resins of I.V. lower than 0.75 can be successfully injection molded into acceptable pre-forms and then blow molded into large bottles bearing similar properties to those made from the higher I.V. resins (I.V.>0.8) usually needed for such applications. To show this application, injection-blow molding compositions comprising 99.5 parts of virgin PET of I.V.=0.73 (K3301 from Kosa) were pre-dried to less than 0.02% moisture, mixed with 0.5 parts of chain extender G of this invention, and with 0.5 parts of Master Batch S (containing 50% of chain extender

TABLE 13

Comparative Evaluations of Chain Extended PC for Injection Molding Applications

| | | | | | Formulation | | |
|---|---|---|---|---|---|---|---|
| | | | PC Control | PC + PD-R 0.6% | PC + PD-R 1.2% | PC + PD-S 0.6% | PC + PD-S 1.2% |
| | | | | | PC Pre-dried | | |
| | | | Yes | Yes | Yes | Yes | Yes |
| | | | | | Moisture Content(%)* | | |
| Physical Property | Test Method | Unit | <0.02 | <0.02 | <0.02 | <0.02 | <0.02 |
| Flexural Modulus | ASTM D790 | MPa | 2441 | 2455 | 2455 | 2421 | 2462 |
| Flexural Strength | ASTM D790 | MPa | 97.2 | 97.9 | 99.3 | 97.9 | 99.3 |
| Izod Impact (notched) | ASTM D256 | J/m | 875.4 | 907.5 | 912.8 | 912.8 | 902.1 |
| Tensile Strength @ Yield | ASTM D638 | MPa | 61.3 | 62.1 | 61.9 | 61.2 | 62.5 |
| Elongation @ Yield | ASTM D638 | % | 6.0 | 6.2 | 6.0 | 5.9 | 6.3 |
| Young's Modulus | ASTM D638 | MPa | 2455 | 2414 | 2469 | 2476 | 2441 |

*Moisture analysis was carried out in a OmniMark Mark II loss-in-weigh analyzer. Partial drying was to 0.02% +/− 0.005%.

G), and then processed through a single injection molding step into standard 2 liter bottle pre-forms (PRE-0246C). Formulations and injection molding conditions are given below in Table 14. High I.V.=0.84 PET resin (61802 from Wellman) was used as a control for comparison.

TABLE 14

Injection Molding of PET Bottle Pre-Forms from Chain Extended Low I.V. PET.

| Formulation | PET-1 I.V. = 0.84 Control | PET-2 I.V. = 0.73 Control | PET-2 + 0.5% Chain Extender G | PET-2 + 0.5% PD-S |
|---|---|---|---|---|
| Injection Molding Machine | Arburg 420 C | Arburg 420 C | Arburg 420 C | Arburg 420 C |
| Preform # | PRE-0246C | PRE-0246C | PRE-0246C | PRE-0246C |
| Preform Weight (g) | 48 +/− 0.5 | 48 +/− 0.5 | 48 +/− 0.5 | 48 +/− 0.5 |
| Barrel Temperatures | | | | |
| Feed (° C.) | 270 | 199 | 229 | 200 |
| Zone 1 (° C.) | 271 | 225 | 250 | 225 |
| Zone 2 (° C.) | 271 | 279 | 280 | 280 |
| Zone 3 (° C.) | 271 | 280 | 280 | 280 |
| Injection Variables | | | | |
| Injection Pressure 1 (bar) | 500 | 700 | 700 | 700 |
| Injection Pressure 2 (bar) | 500 | 700 | 700 | 700 |
| Injection Time (sec) | 5.35 | 3.26 | 3.25 | 3.25 |
| $1^{st}$ Injection Speed (ccm/sec) | 16.0 | 12.0 | 12.0 | 12.0 |
| $2^{nd}$ Injection Speed (ccm/sec) | 12.0 | 12.0 | 12.0 | 12.0 |
| Holding Pressures | | | | |
| Switch over point (ccm) | 13.0 | 13.0 | 13.0 | 13.0 |
| $1^{st}$ Hold Pressure (bar) | 450 | 450 | 450 | 450 |
| $2^{nd}$ Hold Pressure (bar) | 525 | 525 | 525 | 525 |
| $3^{rd}$ Hold Pressure (bar) | 200 | 300 | 300 | 300 |
| $4^{th}$ Hold Pressure (bar) | 150 | 150 | 150 | 150 |
| $1^{st}$ Hold Pressure Time (sec) | 0.0 | 0.0 | 0.0 | 0.0 |
| $2^{nd}$ Hold Pressure Time (sec) | 3.5 | 3.5 | 3.5 | 3.5 |
| $3^{rd}$ Hold Pressure Time (sec) | 5.0 | 7.0 | 7.0 | 7.0 |
| $4^{th}$ Hold Pressure Time (sec) | 2.0 | 2.0 | 2.0 | 2.0 |
| Remain Cool Time (sec) | 21.0 | 50.0 | 50.0 | 50.0 |
| Dosage | | | | |
| Circumference Speed (m/min) | 10.0 | 6.0 | 8.0 | 6.0 |
| Back Pressure (bar) | 30.0 | 15.0 | 15.0 | 15.0 |
| Dosage Volume (ccm) | 47.0 | 47.0 | 47.0 | 47.0 |
| Measure Dosage Time (sec) | 6.5 | 32.0 | 39.0 | 33.7 |
| Cushion (ccm) | 5.79 | 4.73 | 4.39 | 4.58 |
| Adjustment Data | | | | |
| Cycle Time (sec) | 42.3 | 71.4 | 74.0 | 74.3 |

The above performs were free-blown (FB) at 100° C. and 60 psi of pressure. The comparative results of the free-blown bottles thus obtained are shown below in Table 15.

TABLE 15

Comparative Evaluations of Chain Extended PET in Free Blow Molding

| Formulation | PET-1 Control | PET-2 Control | PET-2 + 0.5% chain ext. G | PET-2 + 0.5% PD-S |
|---|---|---|---|---|
| I.V. of Unprocessed Resin | 0.840 | 0.722 | 0.722 | 0.722 |
| I.V. of Preform | 0.774 | 0.680 | 0.690 | 0.706 |
| FB Bubble Crystallinity (%) | 24.5 | 23.2 | 22.4 | 22.5 |
| Areal Strain | 7.6 | 9.79 | 10.95 | 10.76 |
| FB Volume (cc) | 1842.3 | 2655.4 | 2595.9 | 2721.7 |

Example 12

Applications in Sheet Extrusion from Virgin, Recycled, or Reprocessed Low I.V. Feedstock In order to show the ability of the chain extenders of this invention to enhance the performance of severely degraded polycondensate resins, virgin copolyester resin with I.V.=0.8 (Eastar EN001 from Eastman Chemicals) was first extruded without drying in a 27 mm co-rotating twin-screw extruder with L/D=40 (Leistritz Micro 27). The resulting material (CoPE-$1^{st}$ Pass) with I.V.=0.715 was pelletized and used to make sheet compositions comprising 97 to 99.5 parts of CoPE-$1^{st}$ Pass which was then pre-dried to less than 0.01% moisture and then mixed with 0.5 to 3 parts of pre-dilutions X, Y and Z each containing 20% of chain extender G of this invention. Compositions were then processed in the same 27 mm extruder fitted with a 7 inch flat sheet die operated(with a temperature profile at the barrel zones between 225° C. at the feed and 300° C. at the last zone, and 235° C. at the die, under 25 mmHg vacuum. The 1st Pass CoPE resin was also processed into sheet under the same conditions and used as a control. Intrinsic viscosity and mechanical properties were measured as described above, melt viscosity was measured in a Rheometrics Scientific SC-5000 operated in shear rate sweep mode with 40 mm parallel plate configuration at 0.5 mm gap.

The resulting sheet products show enhanced I.V. along with higher rheological and mechanical properties. The sheet products also show enhanced surface appearance, much less tendency to block and lower coefficients of friction with itself. The latter is extremely important in sheet applications where sheets are rolled or stacked and low blocking is needed.

Comparative results of the initial and final I.V. are given in Table 16. Mechanical, rheological, and surface properties of the extruded sheets thus obtained are given below in Table 17.

TABLE 16

Comparative I.V. Evaluations of Chain Extended Polyester Copolymer from Degraded Feedstock for Sheet Extrusion Applications

| | Formulation | | | | | | | |
|---|---|---|---|---|---|---|---|---|
| | CoPE 1st Pass Control | CoPE 1st Pass + PD-X 1.0% | CoPE 1st Pass + PD-X 2.0% | CoPE 1st Pass + PD-Y 1.0% | CoPE 1st Pass + PD-Y 2.0% | CoPE 1st Pass + PD-Z 1.0% | CoPE 1st Pass + PD-Z 2.0% | CoPE 1st Pass + PD-Z 3.0% |
| Conc. of Chain Extender G (%) | 0.0 | 0.2 | 0.4 | 0.2 | 0.4 | 0.2 | 0.4 | 0.6 |
| I.V. Before Processing (dL/g) | 0.715 | 0.715 | 0.715 | 0.715 | 0.715 | 0.715 | 0.715 | 0.715 |
| I.V. After Processing (dL/g) | 0.558 | 0.657 | 0.733 | 0.689 | 0.725 | 0.662 | 0.673 | 0.722 |

TABLE 17

Comparative Rheological, Mechanical and Surface Properties of Chain Extended Polyester Copolymer from Degraded Feedstock for Sheet Extrusion Applications

| Physical Property | Test Method | Unit | Formulation | | | | | |
|---|---|---|---|---|---|---|---|---|
| | | | CoPE 1st Pass Control | CoPE 1st Pass + PD-X 0.5% | CoPE 1st Pass + PD-Y 1.0% | CoPE 1st Pass + PD-Y 2.0% | CoPE 1st Pass + PD-Z 2.0% | CoPE 1st Pass + PD-Z 3.0% |
| | | | Conc. of Chain Extender G (%) | | | | | |
| | | | 0.0 | 0.1 | 0.2 | 0.4 | 0.4 | 0.6 |
| | | | I.V. Before Processing (dL/g) | | | | | |
| | | | 0.715 | 0.715 | 0.715 | 0.715 | 0.715 | 0.715 |
| | | | I.V. After Processing (dL/g) | | | | | |
| | | | 0.558 | N/a | 0.689 | 0.725 | 0.673 | 0.722 |
| Melt Viscosity @ 280° C.-0.1/sec | Parallel Plate Rheometry | Pa-sec | 105 | 108 | 168 | 724 | 149 | 96 |
| Melt Viscosity @ 280° C.-1/sec | Parallel Plate Rheometry | Pa-sec | 94 | 95 | 138 | 622 | 121 | 78 |
| Melt Viscosity @ 280° C.-10/sec | Parallel Plate Rheometry | Pa-sec | 65 | 78 | 112 | 445 | 84 | 62 |
| Sheet Thickness | | mm | 0.33–0.42 | 0.38 | 0.28 | 0.22 | 0.38 | 0.22–0.30 |
| Tensile Strength @ break | ASTM D638 | MPa | 43.5 | 43.1 | 53.1 | 42.2 | 57.3 | 67.8 |
| Elongation @ break | ASTM D638 | % | 571 | 560 | 536 | 552 | 495 | 333 |
| Modulus | ASTM D638 | MPa | 932 | 836 | 1022 | 880 | 1002 | 1102 |
| Coefficient of Friction with Self | | — | 0.5687 | 0.4097 | N/a | 0.5528 | N/a | 0.3251 |

Example 13

Applications in Reclaiming Recycled, or Reprocessed Ultra Low I.V. Feedstock

In order to show the ability of the chain extenders of this invention to enhance performance of severely degraded reclaimed or reprocessed polycondensate resins, 98 parts of lowest grade reclaimed PET (R-PET) resin with I.V.=0.40 were dried to less than 0.02% moisture and then mixed with 2 parts of chain extender G of this invention. This composition was then processed in a WP 30 mm co-rotating twin screw extruder (L/D=36) operating at 280° C. and 150 RPM. No vacuum or catalyst were used. The melt viscosity of the product at different shear rates was measured against that of the unmodified control in a Kayeness Galaxy LCR6000 capillary rheometer. Comparative results are given in Table 18. Virgin PET resin of I.V.= 0.73 (3302 from Kosa) from Example 2 has been added as a reference.

TABLE 18

Comparative Rheological Properties of Chain Extended Reclaimed Polyester

| Physical Property | Formulation Test Method | Unit | R-PET Control I.V. = 0.4 | R-PET Control + 2% of Chain Extender G | Virgin PET I.V. = 0.73 |
|---|---|---|---|---|---|
| Melt Viscosity @ 280° C.-100/sec | Capillary Rheometry | Pa-sec | 16 | 71 | 89 |
| Melt Viscosity @ 280° C.-1000/sec | Capillary Rheometry | Pa-sec | 14 | 28 | 80 |

Example 14

Application in Thermoplastic Polyurethanes

In order to show the ability of the chain extenders of this invention to enhance performance of different families of polycondensate resins, 98.5 to 99.5 parts of Ether Based Thermoplastic Polyurethane (Elastolan 1185 from BASF) were dried as per manufacturers recommendations and then mixed with 0.5 to 1.5 parts of chain extender G of this invention. These compositions were then processed in the same extruder of Example 13, operating at 200° C. and 150 RPM. No vacuum or catalyst were used. The melt viscosity of the products at different shear rates was measured against that of the unmodified control as described in Example 13. Comparative results are given in Table 19.

Example 15

Application in Polyethers

In order to show the ability of the chain extenders of this invention to enhance performance of different families of polycondensate resins, 98.5 to 99.5 parts of Polyether-Ester Elastomer (Hytrel 5556 from DuPont) were dried as per manufacturers recommendations and then mixed with 0.5 to 1.5 parts of chain extender G of this invention. These compositions were then processed in the same extruder of Example 13, operating at 240° C. and 150 RPM. No vacuum or catalyst were used. The melt viscosity of the products at different shear rates was measured against that of the unmodified control as described in Example 13. Comparative results are given in Table 20.

TABLE 19

Comparative Rheological Properties of Chain Extended Thermoplastic Polyurethane

| Physical Property | Formulation Test Method | Unit | TPU Control | TPU Control + 0.5% of Chain Extender G | TPU Control + 1.0% of Chain Extender G | TPU Control + 1.5% of Chain Extender G |
|---|---|---|---|---|---|---|
| Melt Viscosity @ 200° C.-100/sec | Capillary Rheometry | Pa-sec | 453 | 540 | 659 | 750 |
| Melt Viscosity @ 200° C.-200/sec | Capillary Rheometry | Pa-sec | 455 | 482 | 589 | 656 |
| Melt Viscosity @ 200° C.-500/sec | Capillary Rheometry | Pa-sec | 376 | 373 | 448 | 491 |
| Melt Viscosity @ 200° C.-1000/sec | Capillary Rheometry | Pa-sec | 281 | 283 | 331 | 363 |

TABLE 20

Comparative Rheological Properties of Chain Extended Polyetherester Elastomer

| Physical Property | Formulation Test Method | Unit | PEE Control | PEE Control + 0.5% of Chain Extender G | PEE Control + 1.0% of Chain Extender G | PEE Control + 1.5% of Chain Extender G |
|---|---|---|---|---|---|---|
| Melt Viscosity @ 240° C.-100/sec | Capillary Rheometry | Pa-sec | 155 | 419 | 862 | 1173 |
| Melt Viscosity @ 240° C.-200/sec | Capillary Rheometry | Pa-sec | 158 | 339 | 614 | 776 |
| Melt Viscosity @ 240° C.-500/sec | Capillary Rheometry | Pa-sec | 142 | 247 | 389 | 459 |
| Melt Viscosity @ 240° C.-1000/sec | Capillary Rheometry | Pa-sec | 119 | 189 | 274 | 314 |

Example 16

Application in PETG

In order to show the ability of the chain extenders of this invention to enhance performance of different families of polycondensate resins, 98.5 to 99.5 parts of PETG (Eastar 6763 from Eastman Chemical) were dried as per manufacturers recommendations and then mixed with 0.5 to 1.5 parts of chain extender G of this invention. These compositions were then processed in the same extruder of Example 13, operating at 230° C. and 150 RPM. No vacuum or catalyst were used. The melt viscosity of the products at different shear rates was measured against that of the unmodified control as described in Example 15. Comparative results are given in Table 21.

1.5 parts of chain extender G of this invention. These compositions were then processed in the same extruder of Example 13, operating at 260° C. and 150 RPM. No vacuum or catalyst were used. The melt viscosity of the products at different shear rates was measured against that of the unmodified control as described in Example 13. Comparative results are given in Table 22.

TABLE 21

Comparative Rheological Properties of Chain Extended PETG

| Physical Property | Formulation Test Method | Unit | PETG Control | PETG Control + 0.5% of Chain Extender G | PETG Control + 1.0% of Chain Extender G | PETG Control + 1.5% of Chain Extender G |
|---|---|---|---|---|---|---|
| Melt Viscosity @ 230° C.-100/sec | Capillary Rheometry | Pa-sec | 916 | 1547 | 1832 | 2401 |
| Melt Viscosity @ 230° C.-200/sec | Capillary Rheometry | Pa-sec | 825 | 1261 | 1429 | 1762 |
| Melt Viscosity @ 230° C.-500/sec | Capillary Rheometry | Pa-sec | 629 | 854 | 933 | 1086 |
| Melt Viscosity @ 230° C.-1000/sec | Capillary Rheometry | Pa-sec | 459 | 582 | 628 | 711 |

Example 17

Application in PBT

In order to show the ability of the chain extenders of this invention to enhance performance of different families of polycondensate resins, 98.5 to 99.5 parts of Polybutylene Terephthalate (PBT Ticona Celanex 2002) were dried as per manufacturers recommendations and then mixed with 0.5 to

TABLE 22

Comparative Rheological Properties of Chain Extended PBT

| Physical Property | Formulation | | | PBT Control | PBT Control + 0.5% of Chain Extender G | PBT Control + 1.0% of Chain Extender G | PBT Control + 1.5% of Chain Extender G |
|---|---|---|---|---|---|---|---|
| | Test Method | Unit | | | | | |
| Melt Viscosity @ 260° C.-100/sec | Capillary Rheometry | Pa-sec | | 118 | 254 | 638 | 1279 |
| Melt Viscosity @ 260° C.-200/sec | Capillary Rheometry | Pa-sec | | 138 | 255 | 486 | 880 |
| Melt Viscosity @ 260° C.-500/sec | Capillary Rheometry | Pa-sec | | 141 | 221 | 332 | 543 |
| Melt Viscosity @ 260° C.-1000/sec | Capillary Rheometry | Pa-sec | | 124 | 176 | 245 | 381 |

Example 18

Application in Polycarbonate/Polyamide Blends

In order to show the ability of the chain extenders of this invention to enhance performance of different blends of polycondensate resins, 98.5 to 99.5 parts of a mix comprised of 80% of polycarbonate (Makrolon 2608 from Bayer) and 20% of Polyamide 6 (Ultramid B3 from BASF) were dried separately as per manufacturers recommendations, and then dry-blended with 0.5 to 1.5 parts of chain extender G of this invention. These compositions were then processed in the same extruder of Example 13, operating at 285° C. and 150 RPM. No vacuum or catalyst were used. The melt viscosity of the products at different shear rates was measured against that of the unmodified control as described in Example 13. Comparative results are given in Table 23.

20% of polybutyleneterephthalate (1600A from Ticona Celanex) were dried separately as per manufacturers recommendations, and then dry-blended with 0.5 to 1.5 parts of chain extender G of this invention. These compositions were then processed in the same extruder of Example 13, operating at 285° C. and 150 RPM. No vacuum or catalyst were used. The melt viscosity of the products at different shear rates was measured against that of the unmodified control as described in Example 13. Comparative results are given in Table 24.

TABLE 23

Comparative Rheological Properties of Chain Extended PC/PA Blends

| Physical Property | Formulation | | | PC/PA Control | PC/PA Control + 0.5% of Chain Extender G | PC/PA Control + 1.0% of Chain Extender G | PC/PA Control + 1.5% of Chain Extender G |
|---|---|---|---|---|---|---|---|
| | Test Method | Unit | | | | | |
| Melt Viscosity @ 285° C.-100/sec | Capillary Rheometry | Pa-sec | | 205 | 81 | 150 | 134 |
| Melt Viscosity @ 285° C.-200/sec | Capillary Rheometry | Pa-sec | | 129 | 117 | 160 | 130 |
| Melt Viscosity @ 285° C.-500/sec | Capillary Rheometry | Pa-sec | | 89 | 137 | 158 | 132 |
| Melt Viscosity @ 285 ° C.-1000/sec | Capillary Rheometry | Pa-sec | | 79 | 121 | 145 | 139 |

Example 19

Application in Polycarbonate/Polyester Blends

In order to show the ability of the chain extenders of this invention to enhance performance of different blends of polycondensate resins, 98.5 to 99.5 parts of a mix comprised of 80% of polycarbonate (Makrolon 2608 from Bayer) and

TABLE 24

Comparative Rheological Properties of Chain Extended PC/PBT Blends

| Physical Property | Formulation Test Method | Unit | PC/PBT Control | PC/PBT Control + 0.5% of Chain Extender G | PC/PBT Control + 1.0% of Chain Extender G | PC/PBT Control + 1.5% of Chain Extender G |
|---|---|---|---|---|---|---|
| Melt Viscosity @ 285° C.-100/sec | Capillary Rheometry | Pa-sec | 142 | 202 | 330 | 227 |
| Melt Viscosity @ 285° C.-200/sec | Capillary Rheometry | Pa-sec | 156 | 221 | 305 | 228 |
| Melt Viscosity @ 285° C.-500/sec | Capillary Rheometry | Pa-sec | 156 | 213 | 264 | 210 |
| Melt Viscosity @ 285° C.-1000/sec | Capillary Rheometry | Pa-sec | 142 | 185 | 210 | 186 |

Example 20

Application in Polyester/Polyamide Blends

In order to show the ability of the chain extenders of this invention to enhance performance of different blends of polycondensate resins, 98.5 to 99 parts of a mix comprised of 80% polybutylenterephthalate (1600A from Ticona Celanex) and 20% polyamide 6 (Ultramid B3 from BASF) were dried separately as per manufacturers recommendations, and then dry-blended with 0.5 and 1.0 parts of chain extender G of this invention. These compositions were then processed in the same extruder of Example 13, operating at 260° C. and 150 RPM. No vacuum or catalyst were used. The melt viscosity of the products at different shear rates was measured against that of the unmodified control as described in Example 13. Comparative results are given in Table 25.

Example 21

Applications in Injection-Molding of PBT

Compositions comprising of 95 parts of polybutylenterephthalate (Valox 325 from GE Plastics) were pre-dried to less than 0.05% moisture, and then parts of chain extender F of this invention, and compounded in a Leistritz 40-mm co-rotating twin screw extruder operating at T=250° C. and 250 RPM. Injection molding was carried out in a Boy 50 injection molding machine with a clamping force of 50 metric tons, fitted with a 28-mm injection screw operating at T=275° C. No vacuum was employed during processing, and no catalyst was employed.

Comparative results against the unmodified polyester of the rheological, mechanical and thermal properties of the moldings thus obtained are given below in Table 26.

TABLE 25

Comparative Rheological Properties of Chain Extended PBT/PA Blends

| Physical Property | Formulation Test Method | Unit | PBT/PA Control | PBT/PA Control + 0.5% of Chain Extender G | PBT/PA Control + 1.0% of Chain Extender G |
|---|---|---|---|---|---|
| Melt Viscosity @ 260° C.-100/sec | Capillary Rheometry | Pa-sec | 83 | 212 | 539 |
| Melt Viscosity @ 260° C.-200/sec | Capillary Rheometry | Pa-sec | 86 | 216 | 404 |
| Melt Viscosity @ 260° C.-500/sec | Capillary Rheometry | Pa-sec | 82 | 185 | 269 |
| Melt Viscosity @ 260° C.-1000/sec | Capillary Rheometry | Pa-sec | 73 | 145 | 195 |

TABLE 26

Comparative Evaluations of Chain Extended PBT for Injection Molding Applications

| Formulation | | PBT Control | PBT + 5% of Chain Extender F |
|---|---|---|---|
| Pre-dried | | Yes | Yes |
| Moisture Content(%)* | | <0.05 | <0.05 |
| Physical Property | Test Method | Unit | | |

| Physical Property | Test Method | Unit | | |
|---|---|---|---|---|
| Melt Flow Index (@ 230° C./2.16 Kg) | ASTM D1238 | g/10 min | 6.5 | 7.5 |
| Vicat Softening Temperature (B @ 50N) | ASTM D648 | ° C. | 170.3 | 172.1 |
| Izod Impact (notched) | ASTM D256 | J/m | 32 | 27 |
| Tensile Strength @ Yield | ASTM D638 | MPa | 56.8 | 57.5 |
| Tensile Strength @ Break | ASTM D638 | MPa | 55.0 | 55.4 |
| Elongation @ Yield | ASTM D638 | % | 3.4 | 3.8 |
| Elongation @ Break | ASTM D638 | % | 10.7 | 8.4 |
| Young's Modulus | ASTM D638 | MPa | 2524 | 2951 |

Example 22

Applications in Injection-Molding of Polyamides

Compositions comprising 98.8 to 99.3 parts of pre-dried polyamide 6 were mixed with 0.5 and 1 parts of Pre-dilution S containing 50% of chain extender G of this invention, and with 0 to 0.2 parts of antioxidant (HD98 from Eastman Chemical). These compositions were then compounded in a Brabender Plasticorder operating at T=230° C. and 50 RPM for a residence time RT=5 minutes. Compounds thus obtained were granulated and then injection molded in a Daca Microinjector operating at T=230° C. No vacuum was employed during processing, and no catalyst was employed.

Comparative results against the unmodified polyamide of the rheological, and mechanical properties of the moldings thus obtained are given below in Table 27, all methods employed have been described above.

Example 23

Applications in Fiber Enhancement

Compositions comprising 99.84 to 99.92 parts of pre-dried PET were mixed with 0.08 to 0.16 parts of pre-dilution Q containing 60% of chain extender G of this invention. These compositions were then processed in a suitable reactor under conditions of temperature and mixing as described above and spun into fibers of different caliper through a die and spinneret. Fibers thus obtained were characterized by Dynamic Mechanical Analyzer (Perkin Elmer Model 2980 DMA).

Comparative results against the unmodified polyester of the dynamical-mechanical properties of the fibers thus obtained are given below in Table 28 all methods employed have been described above.

TABLE 27

Comparative Evaluations of Chain Extended Polyamides for Injection Molding Applications

| Formulation | Polyamide 6 (%) | | 100 -control 1- | 99.8 -control 2- | 99.3 | 98.8 |
|---|---|---|---|---|---|---|
| | HD-98 (%) | | 0.0 | 0.2 | 0.2 | 0.2 |
| | Pre-dilution S (%) | | 0.0 | 0.0 | 0.5 | 1.0 |
| | Conc. of Chain Extender G in Formula (%) | | 0.0 | 0.0 | 0.25 | 0.5 |

| Physical Property | Test Method | Unit | | | | |
|---|---|---|---|---|---|---|
| Melt Flow Index (@ 235° C./2.16 Kg) | ASTM D1238 | g/10 min | 9.16 | 8.20 | 5.88 | 3.93 |
| Viscosity @ 235° C. (shear rate) | Parallel plate | Pa-sec (1/sec) | 1210 (16.2) | 1395 (14.0) | 1946 (10.07) | 2914 (6.72) |
| Tensile Strength @ Max Stress | ASTM D638 | MPa | 49.3 | 52.8 | 56.3 | 57.9 |
| Elongation @ Break | ASTM D638 | % | 181.5 | 196.3 | 189.9 | 176.3 |
| Young's Modulus | ASTM D638 | MPa | 970 | 985 | 1017 | 1059 |

TABLE 28

Comparative Evaluations of Chain Extended PET for Fiber Applications

| | Formulation (% by weight) PET (%) | | |
|---|---|---|---|
| | 99.84 | 99.92 | 99.92 |
| | Fiber Caliper | | |
| | 7.4 dpf POY | 7.4 dpf POY Pre-dilution Q | 4.5 dpf FDY |
| | 0.16 | 0.08 | 0.08 |
| | | Conc. Of Chain Extender G in | |
| Physical | | Formula | |
| Property | 0.096 | 0.048 | 0.048 |
| Tensile strength (Yield Point), MPa | 690 | 2,608 | 3,905 |
| Tensile strength (at break), MPa | 1,755 | 6,061 | 5,770 |
| Elongation at Yield, % | 3.9 | 3.7 | 4.6 |
| Elongation at Break, % | 287.6 | 247.6 | 40.6 |
| Tensile Modulus, MPa | 17,907 | 72,290 | 118,202 |

Example 24

Applications in Increasing Regrind or Recycle Content in Formulations

Compositions comprising 0, 10 or 50 parts of regrind of extruded PET sheet were mixed with 100 to 50 parts virgin PET and various amounts of suitable pre-dilution containing various amount of a chain extender of this invention. These compositions were then processed into transparent sheet using the same equipment and conditions as in Example 12.

Comparative results show that without the chain extender of this invention the maximum regrind possible is about 10% before loosing required properties whereas the use of 2% of the chain extender G allowed for 50% regrind to be processed into high quality sheet.

While certain embodiments have been illustrated and described, it should be understood that changes and modifications can be made therein in accordance with ordinary skill in the art without departing from the invention in its broader aspects as defined in the following claims.

What is claimed is:

1. A chain-extended polymeric composition comprising:
   (a) a chain extender comprising a polymerization product of:
      (i) at least one epoxy-functional (meth)acrylic monomer; and
      (ii) at least one styrenic and/or (meth)acrylic monomer;
   (b) at least one condensation polymer;
   wherein the chain extender has an epoxy equivalent weight of from about 180 to about 2800, a number-average epoxy functionality (Efn) value of less than about 30, a weight-average epoxy functionality (Efw) value of up to about 140, and a number-average molecular weight ($M_n$) value of less than 6000 and wherein at least a portion of the chain extender has reacted with at least a portion of the at least one condensation polymer to produce a chain-extended condensation polymer wherein the polymeric composition is substantially free of gel particles.

2. The polymeric composition of claim 1, wherein the chain extender has a polydispersity index of from about 1.5 to about 5.

3. The polymeric composition of claim 1, wherein the chain extender comprises about 50 to about 80 weight percent of the at least one epoxy-functional (meth)acrylic monomer and about 20 to about 50 weight percent of the at least one styrenic and/or (meth)acrylic monomer.

4. The polymeric composition of claim 1, wherein the chain extender comprises about 25 to about 50 weight percent of the at least one epoxy-functional (meth)acrylic monomer and about 50 to about 75 weight percent of the at least one styrenic and/or (meth)acrylic monomer.

5. The polymeric composition of claim 1, wherein the chain extender comprises about 5 to about 25 weight percent of the at least one epoxy-functional (meth)acrylic monomer and about 75 to about 95 weight percent of the at least one styrenic and/or (meth)acrylic monomer.

6. The polymeric composition of claim 1, wherein the chain extender has a weight average molecular weight of less than about 25,000.

7. The polymeric composition of claim 1, wherein the chain extender is made in a reactor by a continuous polymerization process at a polymerization temperature of from about 180° C. to about 350° C. with a residence time in the reactor of less than about 60 minutes.

8. The polymeric composition of claim 1, wherein the chain extender is present in an amount of less than about 5 weight percent based on the total weight of the at least one condensation polymer and the chain extender.

9. The polymeric composition of claim 1, wherein the at least one condensation polymer is selected from the group consisting of polyesters, polyamides, polycarbonates, polyurethanes, polyacetals, polysulfones, polyphenylene ethers, polyether sulfones, polyimides, polyether imides, polyether ketones, polyether-ether ketones, polyarylether ketones, polyarylates, polyphenylene sulfides and polyalkyls.

10. The polymeric composition of claim 1, wherein the at least one condensation polymer is a condensation polymer that has been recycled or reprocessed.

11. The polymeric composition of claim 10, wherein the chain-extended condensation polymer has a molecular weight that is equal to or greater than the initial molecular weight of the at least one condensation polymer prior to recycling or reprocessing.

12. The polymeric composition of claim 10, wherein the chain-extended condensation polymer has an intrinsic viscosity that is equal to or greater than the initial intrinsic viscosity of the at least one condensation polymer prior to recycling or reprocessing.

13. The polymeric composition of claim 1, wherein the at least one condensation polymer is not pre-dried prior to the reaction of at least a portion of the chain extender with at least a portion of the at least one condensation polymer.

14. The polymeric composition of claim 1, wherein the reaction of at least a portion of the chain extender with at least a portion of the at least one condensation polymer is carried out in the absence of a catalyst.

15. A plastic article made from the polymeric composition of claim 1.

16. The plastic article of claim 14, wherein the plastic article is made using a process selected from the group consisting of blow molding, injection molding, extrusion, compression molding, rotational molding, calendaring, and fiber spinning.

17. The plastic article of claim 14, wherein the article is selected from the group consisting of food containers, non-food containers, films, coatings, tapes, moldings, fibers, extrusion profiles, and strapping.

18. A method for increasing the molecular weight of a condensation polymer comprising reacting a chain extender comprising a polymerization product of:
 (i) at least one epoxy-functional (meth)acrylic monomer; and
 (ii) at least one styrenic and/or (meth)acrylic monomer; with at least one condensation polymer wherein the chain extender has an epoxy equivalent weight of from about 180 to about 2800, a number-average epoxy functionality (Efn) value of less than about 30, a weight-average epoxy functionality (Efw) value of up to about 140, and a number-average molecular weight ($M_n$) value of less than 6000 and wherein condensation polymer with increased molecular weight is substantially free of gel particles.

19. The method of claim 18, wherein the chain extender has a polydispersity index of from about 1.5 to about 5.

20. The method of claim 18, wherein the chain extender comprises about 50 to about 80 weight percent of the at least one epoxy-functional (meth)acrylic monomer and about 20 to about 50 weight percent of the at least one styrenic and/or (meth)acrylic monomer.

21. The method of claim 18, wherein the chain extender comprises about 25 to about 50 weight percent of the at least one epoxy-functional (meth)acrylic monomer and about 50 to about 75 weight percent of the at least one styrenic and/or (meth)acrylic monomer.

22. The method of claim 18, wherein the chain extender comprises about 5 to about 25 weight percent of the at least one epoxy-functional (meth)acrylic monomer and about 75 to about 95 weight percent of the at least one styrenic and/or (meth)acrylic monomer.

23. The method of claim 18, wherein the chain extender is made in a reactor by a continuous polymerization process at a polymerization temperature of from about 180° C. to about 350° C. with a residence time in the reactor of less than about 60 minutes.

24. The method of claim 18, wherein the chain extender has a weight average molecular weight of less than about 25,000.

25. The method of claim 18, wherein the chain extender is present in an amount of less than about 5 weight percent based on the total weight of the at least one condensation polymer and the chain extender.

26. The method of claim 18, wherein the at least one condensation polymer is selected from the group consisting of polyesters, polyamides, polycarbonates, polyurethanes, polyacetals, polysulfones, polyphenylene ethers, polyether sulfones, polyimides, polyether imides, polyether ketones, polyether-ether ketones, polyarylether ketones, polyarylates, polyphenylene sulfides and polyalkyls.

27. The method of claim 18, wherein the at least one condensation polymer is a condensation polymer that has been recycled or reprocessed.

28. The method of claim 27, wherein the chain-extended condensation polymer has a molecular weight that is equal to or greater than the initial molecular weight of the at least one condensation polymer prior to recycling or reprocessing.

29. The method of claim 27, wherein the chain-extended condensation polymer has an intrinsic viscosity that is equal to or greater than the initial intrinsic viscosity of the at least one condensation polymer prior to recycling or reprocessing.

30. The method of claim 18, wherein the at least one condensation polymer is not pre-dried prior to reacting with the chain extender.

31. The method of claim 18, wherein reaction between the chain extender and the at least one condensation polymer is carried out in the absence of a catalyst.

32. The method of claim 18, wherein the chain extended polycondensation polymer is substantially free of gel particles.

33. The method of claim 18, wherein reacting the chain extender with the at least one condensation polymer is carried out, at least in part, by melt blending the chain extender and the at least one condensation polymer at a temperature above the glass transition temperature of the chain extender and above either the glass transition temperature of the condensation polymer or above both the melting temperature and the glass transition temperature of the condensation polymer.

34. The method of claim 33, wherein the melt blending takes place in a reactor selected from the group consisting of a single screw extruder, a twin screw extruder, a Banbury mixer, a Farrell continuous mixer, a Buss co-kneader, and a roll mill.

35. The method of claim 33, wherein the melt blending takes place in a reactor and the chain extender and the at least one condensation polymer have an average residence time in the reactor of less than about 15 minutes.

36. The method of claim 33, wherein the chain extender and the at least one condensation polymer are pre-compounded prior to melt blending.

37. The method of claim 18, wherein reacting the chain extender with the at least one condensation polymer is carried out, at least in part, through solid state polymerization of the chain extender with the at least one condensation polymer at a temperature above the glass transition temperature of the chain extender and between the glass transition temperature and the melting temperature of the condensation polymer.

38. The method of claim 37, wherein the solid state polymerization takes place in a reactor and the chain extender and the at least one condensation polymer reactants have an average residence time of less than about 24 hours.

* * * * *